(12) United States Patent
Chen et al.

(10) Patent No.: US 8,966,643 B2
(45) Date of Patent: Feb. 24, 2015

(54) CONTENT SECURITY IN A SOCIAL NETWORK

(75) Inventors: Sherman (Xuemin) Chen, Rancho Santa Fe, CA (US); Marcus C. Kellerman, San Diego, CA (US); Wael W. Diab, San Francisco, CA (US); Yasantha N. Rajakarunanayake, San Ramon, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 145 days.

(21) Appl. No.: 13/436,085

(22) Filed: Mar. 30, 2012

(65) Prior Publication Data

US 2013/0091582 A1 Apr. 11, 2013

Related U.S. Application Data

(60) Provisional application No. 61/545,147, filed on Oct. 8, 2011.

(51) Int. Cl.
*H04L 29/06* (2006.01)
*H04L 29/08* (2006.01)
(Continued)

(52) U.S. Cl.
CPC .............. *H04L 67/306* (2013.01); *G06Q 10/10* (2013.01); *G06Q 50/01* (2013.01); *H04L 63/105* (2013.01);
(Continued)

(58) Field of Classification Search
CPC ..................................................... H04L 63/105
USPC ........................................................... 726/26
See application file for complete search history.

(56) References Cited

U.S. PATENT DOCUMENTS 6,466,980 B1 10/2002 Lumelsky
7,698,380 B1 * 4/2010 Amidon et al. ............... 709/218
(Continued)

FOREIGN PATENT DOCUMENTS

EP 1942614 A1 7/2008
WO 0176192 A2 10/2001
WO 2008137742 A1 11/2008

OTHER PUBLICATIONS

European Patent Office; European Search Report; EP Application No. 12005729; Mar. 18, 2013; 6 pgs.
(Continued)

*Primary Examiner* — Mohammad L Rahman
(74) *Attorney, Agent, or Firm* — Garlick & Markison; Edward J. Marshall

(57) ABSTRACT

Members of a social network (SNET) circle can share content with other members of SNET circle, members of the same SNET that are not members of the same circle, or send content to people or devices outside of SNET. Different levels of content security can be applied to the shared content, depending on who requests the content, the destination of the content, user preferences, content type, SNET, SNET circle, or other security parameters. Content can be tagged to limit the number of times it can be accessed, the length of time access is allowed, and to otherwise control redistribution. Content can also be protected by limiting host network access to the content, implementing SNET circle firewalls and virtual private networks, or transcoding content before allowing transmission to non-SNET circle or SNET members. Docking of devices into an SNET security circle can be restricted to properly secured devices.

21 Claims, 12 Drawing Sheets

(51) Int. Cl.
*G06Q 10/10* (2012.01)
*G06Q 50/00* (2012.01)
*H04N 21/8358* (2011.01)
*G06F 21/10* (2013.01)
*H04W 4/20* (2009.01)

(52) U.S. Cl.
CPC ............ *H04N 21/8358* (2013.01); *G06F 21/10* (2013.01); *H04W 4/206* (2013.01); *H04L 67/303* (2013.01); *G06F 2221/2113* (2013.01)
USPC .......................................................... 726/26

(56) References Cited

U.S. PATENT DOCUMENTS

| | | |
|---|---|---|
| 2004/0029553 A1 | 2/2004 | Cain |
| 2004/0258064 A1 | 12/2004 | Nakamura et al. |
| 2006/0248584 A1 | 11/2006 | Kelly |
| 2010/0015991 A1 | 1/2010 | Evans |
| 2010/0095009 A1* | 4/2010 | Matuszewski et al. ........ 709/228 |
| 2010/0257239 A1* | 10/2010 | Roberts ......................... 709/204 |
| 2012/0110111 A1* | 5/2012 | Luna et al. .................... 709/213 |
| 2012/0237908 A1* | 9/2012 | Fitzgerald et al. ............. 434/236 |
| 2013/0080467 A1* | 3/2013 | Carson et al. ................. 707/769 |
| 2013/0088484 A1* | 4/2013 | Marra et al. ................... 345/418 |
| 2013/0091214 A1* | 4/2013 | Kellerman et al. ........... 709/204 |

OTHER PUBLICATIONS

European Patent Office; European Search Report; EP Application No. 12005730.2; Mar. 18, 2013; 3 pgs.
European Patent Office; European Search Report; EP Application No. 12006966.1; Mar. 28, 2013; 5 pgs.
European Patent Office; EP Search Report; EP Application No. 12006967.9; Mar. 28, 2013; 3 pgs.
European Patent Office; European Search Report; EP Application No. 12006970.3; Mar. 28, 2013; 3 pgs.

* cited by examiner

CONTENT SECURITY IN A SOCIAL NETWORK

CROSS REFERENCE TO RELATED PATENTS

This application claims the benefit of U.S. Provisional Application No. 61/545,147, filed Oct. 8, 2011, and entitled "Social Network Device Memberships and Resource Allocation," which is incorporated herein in its entirety by reference for all purposes.

INCORPORATION BY REFERENCE

The following U.S. Utility patent applications are hereby incorporated herein by reference in their entirety and made part of the present U.S. Utility patent application for all purposes:

1. U.S. application Ser. No. 13/342,301, filed Jan. 3, 2012, and entitled, "Social Network Device Memberships and Applications,";
2. U.S. application Ser. No. 13/408,986, filed Feb. 29, 2012, and entitled, "Social Device Resource Management,";
3. U.S. application Ser. No. 13/408,991, filed Feb. 29, 2012, and entitled, "Social Device Anonymity Via Full, Content Only, and Functionality Access Views,";
4. U.S. application Ser. No. 13/396,449, filed Feb. 14, 2012, and entitled, "Social Device Security in a Social Network,";
5. U.S. application Ser. No. 13/337,495, filed Dec. 27, 2011, and entitled, "Advanced Content Hosting,"; and
6. U.S. application Ser. No. 13/351,822, filed Jan. 17, 2012, and entitled, "Ad Hoc Social Networking,".

BACKGROUND

1. Technical Field

This invention relates generally to content that is stored or distributed in the context of a social network, and more particularly to content security in a social network.

2. Description of Related Art

The popularity and growth of social network sites and services has increased dramatically over the last few years. Existing social network sites include Facebook, Google+, Twitter, MySpace, YouTube, LinkedIn, Flicker, Jaiku, MYUBO, Bebo and the like. Such social networking sites are typically organized around user profiles and/or collections of content.

In many popular social networks, especially profile-focused social networks, activity centers on web pages or social spaces that enable members to communicate and share activities, interests, opinions, status updates, audio/video content, etc. across networks of contacts. Social networking services might also allow members to track certain activities of other members of the social network, collaborate, locate and connect with former acquaintances and colleagues, and establish new connections with other members.

While social networks are usually comprised of individuals, members might also include companies, restaurants, political parties and event profiles that are represented in a like manner to human members (e.g., profile pages accessible by members of a social network). Individual members typically connect to social networking services through existing web-based platforms via a computing device and/or mobile smartphone. Smartphone and games-based mobile social networking services are other rapidly developing areas.

As the use of social networks continues to proliferate, the limitations of current security measures used in the context of social networks become more of a concern. In many cases, individuals belonging to social networks expect, sometimes mistakenly, that reasonably strong security measures have been implemented to prevent unauthorized access to the social network, and to shared content. As new threats to security of social network content continue to emerge, it becomes apparent that current security measures are less than perfect.

BRIEF DESCRIPTION OF THE SEVERAL VIEWS OF THE DRAWING(S)

DETAILED DESCRIPTION OF THE INVENTION

Figure 1:
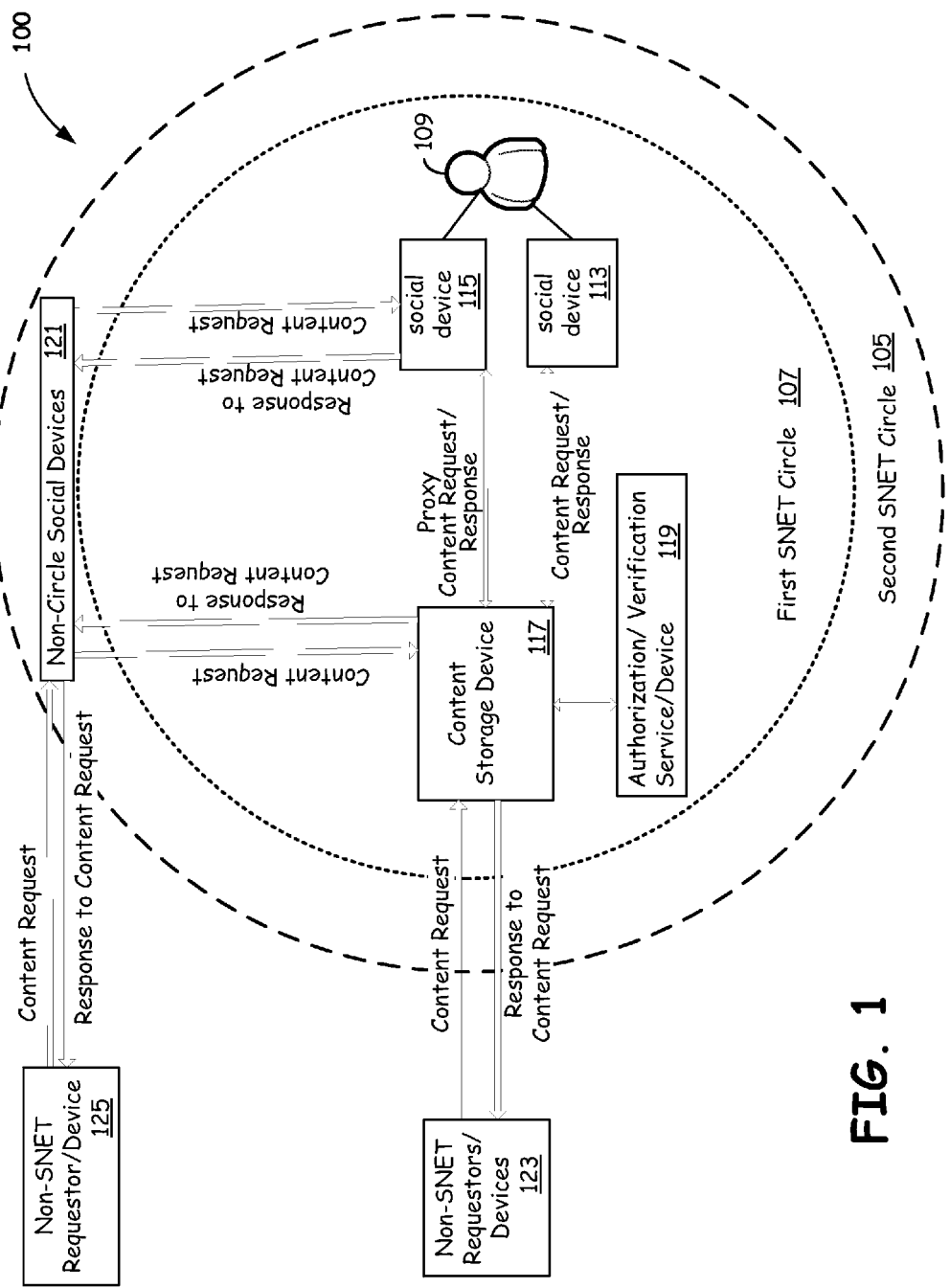
FIG. 1 is a block diagram illustrating content stored in a Social Network (SNET) circle being delivered to various destinations both within and outside of the network circle, according to various embodiments of the present disclosure.

In various embodiments described herein, a social network (SNET) can include multiple different types of members including, but not limited to, devices, humans, groups, businesses, software applications, services, and other social networks. Devices can also be temporarily docked within the SNET, even if such devices are not considered full members.

Docking devices allows them to share limited or full access to at least some resources available via the SNET to which it is docked. The security of each level can be implemented by using separate security secrets, for example public or private keys, for communication between SNET members, by using authentication and trust techniques, or both.

Various SNET implementations described herein are implemented using a self-monitoring, secure social network infrastructure made up of social devices that work together to manage full or partial sharing of social content. The security characteristics of devices, members services, requestors, destinations, presentation pathways, connections, and the like can be determined and used to implement and enforce SNET security. For example, challenges to communication devices included in a presentation pathway can be used ensure continued security of a communication pathway. Security characteristics include, but are not limited to, hardware and software capabilities related to secure storage, communication, and execution of DRM protected content, trust and authentication levels, associations with other devices and members, and the like.

Some such SNETs are divided into one or more circles, sometimes referred to herein as rings, each of which can implement the same or varying levels of content security as other circles within the same SNET. The level of security applied to items or instances of content can be selected based on, among other things, a status of a requestor, a status of a requested destination device, preferences associated with the content requested, SNET circle preferences, security, and trust requirements, satisfaction of authentication requirements, depending on any particular and trust procedures, parameters, protocols, and preferences. The level of protection applied to any particular content can be reevaluated over time based on the same or similar considerations used in establishing an initial determination.

The status of a requestor can depend on, among other things, whether or not the requestor is a member of the same SNET or SNET circle from which the requested content is being provided, results of an authentication challenge, a trust level assigned to the requestor, and a location of the requestor. Membership or other content access rights can be reevaluated over time.

Various trust and authentication techniques described herein can be implemented on an individual member or device basis, on a circle or ring basis, or a combination thereof. These trust and authentication techniques allow SNET members to evaluate the likelihood that other SNET members have been authenticated, assess the likelihood that another SNET member will provide an advertised service at a level of quality advertised, and to determine whether or not a particular SNET member can be trusted or relied upon. Generally, although not always, members having similar levels of trust with respect to authentication can be included in the same circle or ring, thereby allowing other members of the same circle or ring to rely on circle membership as a proxy for an authentication trust level. In some such embodiments, members of a particular circle may have common, or similar, levels of trust with regards to authentication, and different levels of trust with respect to advertised services, information accuracy, or the like. SNET trust and authentication can also include providing the ability to reevaluate and retract some or all rights, at any time, to particular content on an individual, device and group level.

SNET members, docked devices, and SNET services, can be associated with more than one circle, and may also be associated with multiple SNETs. For example, a single content delivery service can be used by multiple different circles or SNETs, or a single device storing one or more instances of a content item can be docked to multiple different circles or SNETs. To facilitate secure transmission of protected content within and between the different circles and SNETs to which a single device or service belongs, a device can store different keys for each of circle and SNET in separate, restricted portions of memory. In addition, content offered by a service or stored on a member or docked device can be maintained in restricted device memory, which can help to limit unauthorized access to individual content instances based on rules, preferences, and security requirements associated with the different circles or SNETS.

Before responding to a request to transfer content to a destination device, the destination device, the requestor, or both can be subjected to third party trust verification. In some cases, for example when the requestor or requested destination device is not a circle or SNET member, a requirement for multiple current circle members to vouch for the requestor or destination device can also be imposed. A level of trust associated with a particular member, device, circle, or other SNET, can in some cases be adaptive, that is the trust level can vary over time based on factors such as previous interactions with other SNET members, interactions with trusted third party sources, the passage of time since a previous authentication procedure, or the like.

Other content security measures include distributing among SNET circle members and devices currently docked in the SNET circle, information such as device, requestor, and content blacklists or whitelists, encoding algorithm selection information, digital rights management (DRM) keys, user preferences, and the like. In some instances, before protected content is delivered to a destination device, the destination device can be required to dock with an SNET or SNET circle, or become an SNET circle member. Various embodiments also employ DRM chaining, group broadcasting, and DRM redirection.

When transmitting content between circles, circle-level authorization can be checked to determine if members of the circle to which the content being sent are authorized to receive the content. For example, a content preference or parameter setting can be used to indicate that members and docked devices of selected circles are designated as authorized to receive some or all content based solely on authenticated membership, or docking, in one of the selected circles. A check can also be made to determine if the member attempting to transmit the content is authorized to do so. This can help to prevent a device from acting as an unauthorized proxy for requests from non-members, or to non-member devices. Content can also be tagged to prevent distribution by unauthorized proxies. In some embodiments, SNET and circle authorization checks can be used to supplement or replace other digital rights management (DRM) restrictions or content protection processes.

An SNET can also include an underlying billing/accounting infrastructure, which provides various content-related billing and accounting functionality including, among others: 1) group discounting, which allows members of a given SNET circle or group to consume content at a discounted rate, as compared to the cost associated with each member of the SNET circle or group consuming the content individually; 2) group caching which allows a single instance of content cached in a social device accessible to an SNET circle or group to be accessed and shared by multiple SNET circle members; and 3) group billing, which facilitates the sharing and distribution of content costs among members of an SNET circle.

Various SNETs also provide social interaction functionality and resource management. Social interaction support includes providing infrastructure, interfaces, and communication channels that provide a way to interact socially in relation to content sharing, e.g. via comments, forum access, tweets, postings, pinning, ratings, descriptions, live-video pop-up, chat windows, or other interactions. The social interaction functionality provides human members a mechanism for enriching the content consumption and sharing experience before, during, and after such consumption.

Social resource management includes controlling access and access priority over an underlying social resource. For example, an owner of a social device can grant users or groups access to a social resource, function or underlying social element, based on a desired order of priority. This can facilitate load balancing, especially in instances where SNET resources are limited, by providing higher resolution content to higher-priority consumers, by establishing an access queue, or the like. As used herein, the term "resources" or "social resources" encompasses both device level and social network infrastructure level (cloud/server) devices, services, software and other functionality, and can includes group multicasting functionality, transcoding, payment means, media and other content, content storage/caching/server, trans-cryption, capture elements (microphones, cameras, mechanical mounting controls), and the like.

As used herein, the terms "social network" and "SNET" comprise a grouping or social structure of devices and/or individuals, as well as connections, links and interdependencies between such devices and/or individuals. Members or actors (including devices) within or affiliated with an SNET may be referred to herein as "nodes", "social devices", "SNET members", "SNET devices", "user devices" and/or "modules". In addition, the terms "SNET circle", "SNET group" and "SNET sub-circle" generally denote an SNET that comprises SNET devices and, as contextually appropriate, human SNET members and personal area networks ("PAN"). As used herein, the term "digital rights management" (DRM), DRM content restrictions, digital rights limitations, and other similar terms are intended to encompass various content protection schemes, standards, protocols, and processes by which various types of data are protected from unauthorized copying and access, including DRM chaining, group broadcasting, and DRM redirection. DRM protected content can include, in addition to pre-recorded content, content being generated and broadcast, multicast, streamed, or other provided live from a social device such as a video recorder, to another device.

The term "trust level" is used to refer to both individual levels of trust, and aggregate or overall levels of trust. For example, an SNET member may have a first level of trust indicating a likelihood that the SNET member is, in fact, who he purports to be. A likelihood that that the SNET member will maintain a promised performance or quality level can be indicated by a second level of trust associated with SNET member, a third level of trust can be used to indicate that the SNET member can provide advertised or promised services, and a fourth level of trust indicating an overall level of trustworthiness. Other types or categories of trust levels can also be implemented according to the teachings set forth herein.

Referring first to FIG. 1, a block diagram illustrating a system 100, in which protected content is transferred between the social network circle and various other devices outside of the social network circle will be discussed according to embodiments of the present disclosure. System 100 includes a first SNET circle 107 and second SNET circle 105. Note that although first SNET circle 107 is illustrated as being included in second SNET circle 105, the two SNET circles can be peers, and one circle need not be a subset of the other.

First SNET circle 107 includes content storage device 117, social device 115, social device 113, authorization/verification service/device 119 and human member 109. The devices within first SNET circle 107 are sometimes referred to as social devices configured to participate in a social network as a parent or child device. In some cases, a social device can also be configured to host an SNET circle. Human member 109 is the only illustrated human member of first SNET circle 107, but additional members can be included.

In at least one embodiment, content storage device 117 stores content that human member 109 desires to share with either other social devices or members of first SNET circle 107 or with devices outside of first SNET circle 107, for example non-circle social devices 121, which are included in second SNET circle 105. In some embodiments, content stored in content storage device 117 can be delivered outside of first SNET circle 107 and second SNET circle 105 to non-SNET requestors or devices, such as requestors/devices 123 and 125. Note that although stored content is referred to generally herein, the various techniques and devices discussed in this specification also apply to "live" generated content.

Each of the social devices illustrated within first SNET circle 107 can be required to comply with various content and device security protocols implemented by an SNET host, which can be realized on a social device such as social device 113 or by an independent server system (not illustrated) that may or may not be a member of any particular SNET circle. In other embodiments, content and device security requirements can be established in an ad-hoc manner by a group of social devices included in first SNET circle 107. These security requirements can be used to limit membership in first SNET circle 107 by imposing various authentication and trust procedures to prevent unwanted access by others to circle resources.

In some embodiments, prior to being allowed to join or dock with at first SNET circle 107, each social device must comply with various authentication or trust requirements, some of which are discussed with reference to later figures. In at least one embodiment, each of the social devices included in first SNET circle 107 communicate with other social devices included in first SNET circle 107 using a common or shared key. Using a common or shared key allows the various social devices to used encrypted or encoded messages to prevent nonmembers from gaining ready access to circle communications. Unless otherwise specified or made clear by its context, the term "member" is used interchangeably with the term "docked," although in some cases a device can be docked and still not be considered a member of a circle. Generally, the term "docked" refers to social devices that have either permanent or temporary membership in an SNET circle, or a device that is otherwise allowed access to circle resources.

In many instances, social devices are associated with human members. For example, social device 115, which may be a cell phone belonging to human member 109, and social device 113, which may be a laptop or tablet associated with human member 109. Other social devices that may be associated with human member 109 include printers, storage devices, video and audio recording and playback devices, communication devices, and the like.

In some embodiments, social devices can be used to implement services that are available for use by other human members of first SNET circle 107 or to social devices docked with first SNET circle 107. Thus for example, content storage device 117 can provide a content delivery service to member of first SNET circle 107, and human member 109 can request the service implemented by content storage device 117 to retrieve stored content and to deliver the content delivered to social device 113 for consumption by human member 109. Note that in this example, content storage device 117 need not be associated with human member 109, but can instead be associated with a different human member (not illustrated), or be a resource available to an SNET host, but not associated with any particular human member.

Continuing with the previous example, human member 109 can use social device 113 to view a list of files available from content storage device 117, and send a request for a desired audio-visual file. In some embodiments, selecting one of the available files automatically initiates a request, from social device 113 to content storage device 117, to deliver the selected content to social device 113, or to another selected location or device. In response to receiving the content request from social device 113, content storage device 117 can determine the status of social device 113, which can include determining whether social device 113, or a member or SNET circle associated with social device 113, has a required DRM license; whether social device 113 is a member of first SNET circle 107; whether social device 113 has the requisite level of trust to receive the content; whether social device 113 is on a blacklist or a whitelist; whether the member with which social device 113 is associated has a requisite level of trust; whether content sent to social device 113 requires transcoding; whether content delivered to social device 113 is to be tagged to limit redistribution, number of playbacks, or limit a time period in which the content can be played back; whether content is to be watermarked; or otherwise determine a proper level of content protection to apply to the requested content before delivering it to social device 113. In some embodiments, social device 113, simply by virtue of docking or membership in first SNET circle 107, is presumed to have at least the minimal level of trust required or desired to receive content protected by a first level of content protection.

If social device 113 is authorized and trusted to receive the requested content, storage device 117 determines a level of content protection to implement based on a number of factors that can include, but is not limited to the following: 1) membership or docking in a particular SNET circle; 2) membership or docking in a particular SNET; 3) a trust level of either the destination device, a requesting device, or a human member associated with the destination and requesting device; 4) user or content preferences; or 6) DRM or other content licenses associated with the content; or 5) a combination of these. Various DRM or other licenses can include content restrictions and security parameters based on device type, SNET circle membership, and various other trust related factors. In some embodiments, the determination can be made based on the encryption or encoding used for the request. By relying on the encryption or encoding used in the request, for example in cases where first SNET circle 107 employs a public-private key encryption system to encode or encrypt messages between social devices, content storage device 117 can be reasonably sure that social device 113 is authorized to receive the requested content.

In various embodiments, including but not limited to those involving the distribution of live content, content security can be set up on a session by session basis, and a single device can have multiple different security and authorization levels. For example, a member may be permitted to view a first live session based on his security characteristics, e.g. a security level, but due to preferences associated with a provider of a second live session, may not be authorized to view the second live session even though the member's security level indicates that he would otherwise be allowed access.

Content storage device 117 can deliver the requested content to social device 113 by encoding the content using a shared circle key or another encryption and encoding method employed by member devices of first SNET circle 107. In some cases, social device 113 and content storage device 117 may be located in a demilitarized zone, behind a circle-dedicated firewall, or may communicate using a virtual private network service. Using the techniques described herein, content can be distributed within first SNET circle 107 without undue concern for the content's safety, and with reduced concern about unauthorized reproduction.

Although social device 115 social device 113 content storage device 117 and authorization/verification service/device 119 are illustrated as being within first SNET circle 107, each of the social devices may be located remotely from each other, in different physical networks or subnets, and use various gateways, routers, switches, and other telecommunication devices, including various wireless communication nodes and devices commonly used for network communications to transfer messages, requests, responses and content among and between members or docked devices.

In some embodiments, content storage device 117 may be a storage unit that does not include the resources or services to locally verify the authorization, trust and membership of destination devices and requestors. In some such cases, an authorization/verification service/device 119 can be queried by content storage device 117 with information received in a content request, to verify the status and trust of a requestor or destination. In some cases, the request is simply forwarded by content storage device without processing the contents of the request, while in others the request is at least partially processed by content storage device before content storage device 117 queries authorization/verification service/device 119.

Authorization/verification service/device 119 can, in some instances, be implemented as a service running on a social device that is a member of first SNET circle 107. Authorization/verification service/device 119 can also be implemented on an SNET host, but may in some instances be an independent or third party service operating outside of any particular SNET or SNET circle. The verification service offered by device 119 is similar to the service offered by content storage device 117, in that the verification service can potentially be made available to any social device docked within first SNET circle 107, not just content storage device 117.

In some instances, a non-circle social device, such as non-circle social devices 121, may request content from content storage device 117. Content storage device 117 can store requested content locally, or obtain content from outside of the SNET, for example from a third party content provider. Non-circle social devices 121 are not members of first SNET circle 107, from which the content is being requested, and therefore may not have the same guarantees of trustworthiness and authentication as those possessed by members and docked devices associated with first SNET circle 107. The non-membership status of non-circle social devices can, in some embodiments, be taken into account when determining the proper level of protection to apply to content, and even whether content is to be delivered to non-circle social devices 121, or whether a request from non-circle social devices 121 is to be honored.

Non-social circle social devices 121 can send a request either directly to content storage device 117 through typical network communication channels, or if a non-circle social device 121 does not have access to communicate directly with content storage device 117, but does have access to social device 115, the non-circle social device 121 can send the content request to social device 115. In response to receiving the request for content social device 115 can determine whether or not the requested content is stored locally, or whether the content is available from another resource in first SNET circle 107. Assuming for purposes of this example that that social device 115 does not store the requested content locally, but can access content storage device 117, social device 115 can make its own determination about whether non-circle social device 121 is authorized to receive the requested content. Social device 115 can also make a determination about whether the requested content is permitted to be provided to non-circle social device 121. Social device 115 can also determine whether or not it is capable of and authorized to make the determination, and if not, forward the request to authorization/verification service/device 119 or some other device that is.

If it is determined that the requested content can be provided to non-circle social devices 121, either directly or through content storage device 117, social device 115 can implement or initiate appropriate security services and measures to provide one or more of multiple different levels of content protection, based at least in part on the status of the non-circle social devices 121 requesting the content, or on the status of a destination device In some cases where social device 115 determines that it does not store the requested content locally, social device 115 can send a proxy content request to content storage device 117. The proxy request can include full or partial information about the status of the requestor or destination device, as determined by social device 115, information about preferences known to social device 115, and the original content request. Content storage device 117 can then rely partially or entirely on the determinations made by social device 115, or make its own determinations about whether to grant the original content request from non-circle social devices 121, and what level of content protection to apply. In some cases, the request can be granted conditionally or partially, for example by providing watermarked or lower quality transcoded content in response to the request.

Content storage device 117 can also determine whether social device 115 is authorized to receive the requested content and forward the content to non-circle social devices 121, or whether the requested content is to be delivered to non-circle social devices 121 without further involvement from social device 115. In some embodiments, content storage device 117 can provide content to social device 115 as a proxy for non-circle social devices 121, and social device 115 can forward the content, with appropriate content protection, to non-circle social devices 121. In some implementations, content storage device 117 can select and apply an appropriate level of content protection prior to sending the content to social device 115 for further distribution outside of first SNET circle 107 to non-circle social devices 121, rather than In yet other embodiments, non-SNET requestor device 125, which is a member of neither first SNET circle 107 nor second SNET circle 105, can send a content request to non-circle social devices 121, and non-circle social devices 121 can forward the content request to content storage device 117 either directly or through social device 115. Thus, in some instances, a request from non-SNET requestor device 125 can be sent to non-circle social devices 121, which act as a proxy communicating with social device 115 which in turn acts as a secondary proxy to content storage device 117. As with the request that originated from non-circle social device 121, content storage device 117 can make its own determination regarding whether non-circle social devices 121 are allowed to receive content, and determine whether non-circle social devices 121 are allowed to send requested content outside of the social network to a non-SNET requestor or device 125.

In some embodiments some content stored in content storage device 117 may be authorized for distribution only within first SNET circle 107, while other content is authorized for distribution to any circle within the SNET. Further restrictions can also be placed on content to prevent redistribution of content outside of first SNET circle 107, to limit a number of times content can be retransmitted, to adjust the quality of content provided based on circle or SNET membership, or otherwise apply different levels of content protection in accordance with content owner, SNET, or content preferences. For example, a particular item of content may be allowed to be distributed to different circles within the SNET, but other content items may be authorized for distribution even outside an SNET, assuming that a non-SNET requestor device 125 is established as a trusted recipient of the content. This allows, for example, for extended implementation of various DRM protocols and licensing features, which require verification of a recipient device prior to delivering content that recipient device.

Various embodiments can implement a level of protection in which a requesting device must either be docked to a particular social network, docked to a particular circle within the social network, or require live that a recipient device check in with a particular SNET or SNET circle to obtain live DRM verification prior to receiving requested content. DRM chaining, in which DRM licensing and trust requirements are checked for some or all intermediate nodes along a path used to distribute protected content, can also be used, and in some instances multiple different nodes may be required to obtain live DRM verification prior to being authorized to participate in the content sharing pathway.

The same content can be authorized for distributed at a high quality level within a first SNET circle 107, but authorized for delivery outside of the first SNET circle 107 only after first being watermarked or transcoded into a lower quality format. Thus, a single type or item of content may be delivered from content storage device 117 to social device 115 at a first quality level, to non-circle social device 121 using a second quality level, and to non-SNET requestor device 125 at yet a third, lower quality level. DRM rights restrictions can also be modified by a destination device to support redistribution by the destination device, allowing a destination device to receive content at a first level of content protection, and transmit content at a second level of content protection.

In addition to, or in place of, watermarking or transcoding content, content storage device 117 may select a level of content protection that allows an item of content to be copied a limited number of times, allows content to be accessed or played back for a limited period of time. For example, a first content file can be delivered to social device 113 or social device 115 at a lower resolution without a tag, or at a higher resolution with a tag that limits whether or not the content can be redistributed. Thus, even within first SNET circle 107, content protection can be implemented to limit the distribution and use of content provided from content storage device 117.

Although in many of the examples discussed above content storage device 117 can store requested content locally, content storage device 117 may itself obtain content from outside of the SNET, for example from a paid subscription to a cable provider, an Internet provider, media provider, or some other content source.

In some embodiments, non-SNET requestors and devices 123 can communicate directly with content storage device 117 using normal communication channels, and content storage device can allow for temporary docking into first SNET circle 107 based on various parameters, preferences, and SNET requirements, provide tagged, watermarked or transcoded content to non-SNET requestors devices 123, or respond to non-SNET requestors/devices 123 and 125 with the proper procedures for them to obtain authorization to receive the requested content.

In some embodiments, in cases where a content request asks for content to be delivered to a third-party device, content storage device 117 can be used to check authentication and trustworthiness of either the requestor, the destination device, or both the requestor and the destination device. Once the status of the destination device, the requestor, or both has been determined, for example by content storage device 117, a circle host, or an SNET host, an appropriate level of content protection can be selected. Various levels of content protection can be applied to content delivered to a device requestor or a destination device based on membership of the device in a particular SNET circle, based on membership of a device within a particular social network, user preferences, preferences or requirements associated with particular content, or the like.

The level of content protection applied can be refined or limited, based on transmission channel characteristics, as determined by a communication node, the destination device, or the content storage device 117. A type of content protection applied can also be restricted based on bandwidth limitations imposed by an SNET host or communication network used to provide the content to a destination device.

Figure 2:
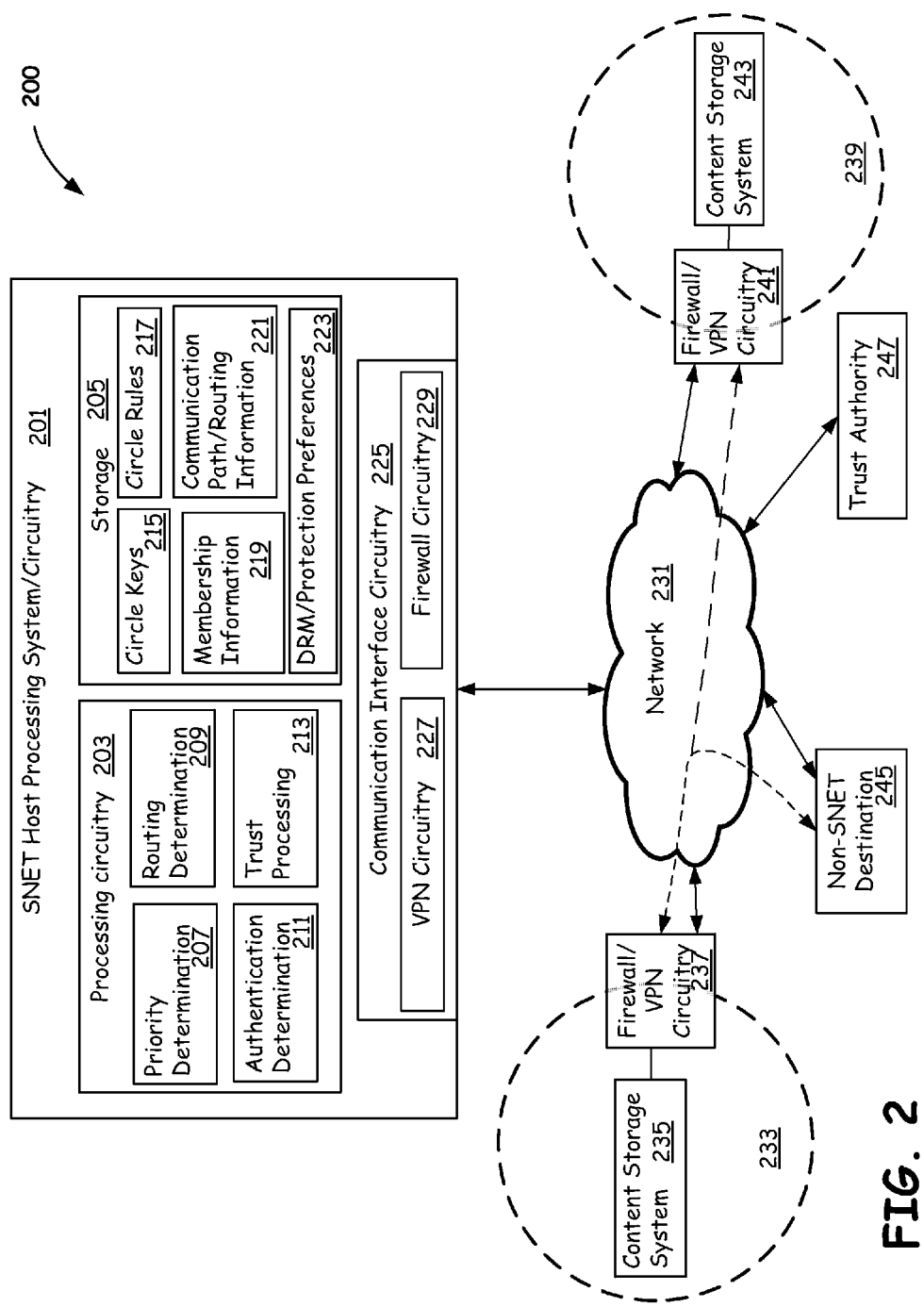
FIG. 2 is a block diagram illustrating an SNET host processing system and circuitry controlling the secure distribution of content according to various embodiments of the present disclosure.

Referring next FIG. 2, a system 200 including SNET host processing system circuitry 201 is illustrated controlling transmission of shared content between SNET circles 233 and 239, and from within SNET circles 233 and 239 to a destination device external to both SNET circles 233 and 239. In some embodiments SNET host processing system circuitry 201 can be used to select an appropriate level of content protection for shared content, and to select routes, or presentation pathways, for delivering requested content. In the illustrated embodiment SNET host processing system circuitry 201 can facilitate transmission of protected content without having access to the content itself. In other embodiments, SNET host processing system circuitry 201 can access the content being transmitted, and is able to encode, encrypt, decode, decrypt, watermark, transcode and otherwise process shared content as necessary for delivery according to a selected security level to be applied to the shared content. The continued security of the presentation pathway can be verified by periodically, or in response to a change in security characteristics, issuing challenges to social devices, services, and communication devices.

SNET host processing system circuitry 201 includes processing circuitry 203 storage 205 and communications interface circuitry 225. The processing circuitry 203 can include priority determination module 207, routing determination module 209, authentication determination processing module 211, and trust processing module 213. Storage 205 can include circle key storage 215, storage for circle rules 217, membership information storage 219 communication path routing information 221, and storage for DRM protection preferences 223. Communication interface circuitry 225 can include VPN circuitry 227 and firewall circuitry 229.

SNET host processing system circuitry 201 can communicate with various social devices in SNET circles 233 and 239 via a network 231. Each of SNET circles 233 and 239 can include firewall/VPN circuitry 237 and 241 to facilitate secure communications between SNET host processing system circuitry 201 and the content storage system 243 and 235. In various embodiments, SNET host processing system circuitry 201 can be implemented in a social device in either circle 233 or 239, in a social device belonging to an SNET that incorporates circles 233 and 239, or in a server system. In some embodiments, SNET host processing system circuitry 201 can be implemented in a temporary, ad hoc manner in one or more suitable devices docked within, or otherwise having access to, the appropriate social network or social network circle.

Priority determination module and circuitry 207 can be used to establish an order in which content is provided to various requestors, destinations, or combinations of requestor and destination device. Thus, for example, requests from a requestor within the same circle to which SNET host processing system circuitry 201 belongs may be granted a higher priority than a requestor outside of that circle, resulting in faster delivery of content within a particular SNET circle. Likewise, requests from certain requestors may be granted a higher priority than requests from other requestors. Likewise, priority may be given to particular destination devices, or to all destination devices within a particular SNET circle.

Priority determination module and circuitry 207 can use DRM/protection preferences 223, communication path/routing information 221, membership information 219, and other information from storage 205 to assign a priority and security level to one or more transfers of protected content. In some embodiments, the priority determination module and circuitry 207 can also receive input from content storage systems 243 or 235, or from an owner of those content storage systems, indicating a priority to be assigned. Using the input from the content storage systems, or the owner of the content storage systems, can provide a mechanism for load balancing. And in some cases, for example, where content storage system 235 is used by a member of SNET circle 233 to both store and consume shared content—for example a wireless phone—the member can lower a priority assigned to a request for shared content, thereby preserving enough bandwidth or processing resources to ensure that the member's consumption experience is not diminished by his sharing of content.

Routing determination module circuitry 209 can be used to determine a pathway by which content is to be delivered from one of the content storage systems 235 or 243 to a requested destination device. The determination can be based on whether SNET host processing system circuitry 201 is to simply broker the request, or whether content is to be transmitted through SNET host processing system circuitry 201. So, for example, if a social device belonging to an SNET circle 233 requests content from content storage system 235, routing determination module 209 can instruct content storage system 235 to deliver the content directly to the requestor or the requested device. Delivery of content in this manner may not require the content to be provided to SNET host processing system circuitry 201, although in some circumstances content may be delivered to SNET host processing system circuitry 201 for delivery to the desired destination.

The routing determination can take into account the DRM access rights of various devices in the selected path, sometimes referred to herein as DRM chaining, and set a level of security based on not only the endpoint devices, but also the DRM access rights and trust levels of intermediate nodes. In this way, if the originating device and the destination device are determined to have the proper DRM access rights and trustworthiness, a path including more trustworthy devices can be selected over a path including less trustworthy devices.

In some instances, transfer of protected content over a less secure pathway can trigger higher security requirements than would otherwise be required.

A non-SNET destination 245 can receive content from content storage system 235 or 243 directly, via paths illustrated by the dotted lines, as directed by routing determination module 209. Alternatively, routing determination 209 may determine that content storage system 243 is to deliver the content indirectly to non-SNET destination 245, by first transmitting the content to SNET host processing system circuitry 201, and then having SNET host processing system circuitry 201 deliver the content to non-SNET destination 245.

Authentication determination module 211 can be used to determine whether or not a requestor or a destination device has been authenticated and authorized to receive requested content. Trust processing system 213 can be used in combination with trust authority 247 to determine whether a content requestor or a requested destination device, such as non-SNET destination 245, is trusted. Authentication determination module 211 and trust processing circuitry and module 213 can be used in conjunction with each other to determine a level of content protection to be applied to shared content being transmitted to a destination device. The determined level of content protection can be used to decide whether content should be tagged, watermarked, transcoded, or whether some other form of content protection should be implemented.

In some embodiments, authentication determination module 211 and trust processing circuitry 213 may determine that content storage system 235 and content storage system 243 are required to deliver content to SNET host processing system circuitry 201 for application of a desired level of content protection. In other instances, authentication determination module 211 and trust processing module 213 can inform content storage systems 243 and 235 of their determinations, and allow the content storage systems to apply the correct level of content protection. Content storage system 235 can also deliver content to another social device for proper application of the selected content protection scheme level. For example, if content storage system 235 is a less-sophisticated storage device, while content since storage system 243 includes more advanced functionality, SNET host processing system circuitry 201 can instruct content storage system 235 to deliver the shared content to content storage system 243, which in turn applies the correct level of protection, for example watermarking, prior to providing the content to non-SNET destination 245. In various embodiments, content storage systems 235 and 243 can incorporate some or all of the functionality of SNET host processing systems circuitry 201.

Storage 205 includes storage for circle keys 215, which allows SNET host processing system circuitry 201 to communicate with multiple different circles using respective circle keys. Storage 205 can also include storage for circle rules 217. Circle rules 217 can, in some instances, be stored in conjunction with content, or pointers to content, so that when particular content is requested, circle rules 217 can be used to assign an appropriate level of content protection. So, for example, circle rules for circle 233 may indicate that any content requested from within circle 233 can be sent only to SNET members or devices docked within an SNET circle 233 or 239, while rules for circle 239 can indicate that content storage system 243 can deliver content to any destination device, regardless of circle membership, so long as a threshold level of trust is met, and the content is watermarked or transcoded to reduce its resolution to a preferred level. Circle rules 217 can also specify particular levels of protection based on DRM licensing information, and may include licensing information associated with various members of the SNET circle or circles being hosted.

Membership information 219 can include information relating to the membership or trust status of particular devices or particular circles, associations of devices with human members, blacklists, white lists, licenses, or the like. The membership information can be used in conjunction with other information to assist in selecting a level of content protection to apply to shared content. Communication path routing information 221 can include information such as IP addresses for storage content systems 235 and 243, information associated with the number of hops between member devices, the type of communication pathways between SNET host processing system circuitry 201 and various social devices, which paths are capable of implementing VPNs, and which devices are included behind firewalls circuitry 229.

DRM protection preferences 223 can be associated with a device, types of devices, a user, particular content or instances of content, DRM licenses or license types, and the like, thereby enabling the SNET host processing system circuitry 201 to determine a preferred type of content protection to apply to requested content, to content requested by particular requestors, to content requested by a particular class of requestors, to content requested to be delivered to a particular device, to a particular class of devices, to particular device statuses, to devices within particular SNETs or SNET circles, to devices having a particular trust level, and so on. Authentication determination 211, trust processing 213, routing determination 209, and priority determination 207 can all use DRM protection preferences 223, communication path routing information 221, membership information 219, circle rules 217, and circle keys 215 in determining whether or not to provide content to particular destinations, whether or not to provide content in response to requests by particular requestors, and the type and level of content protection to apply.

Figure 3:
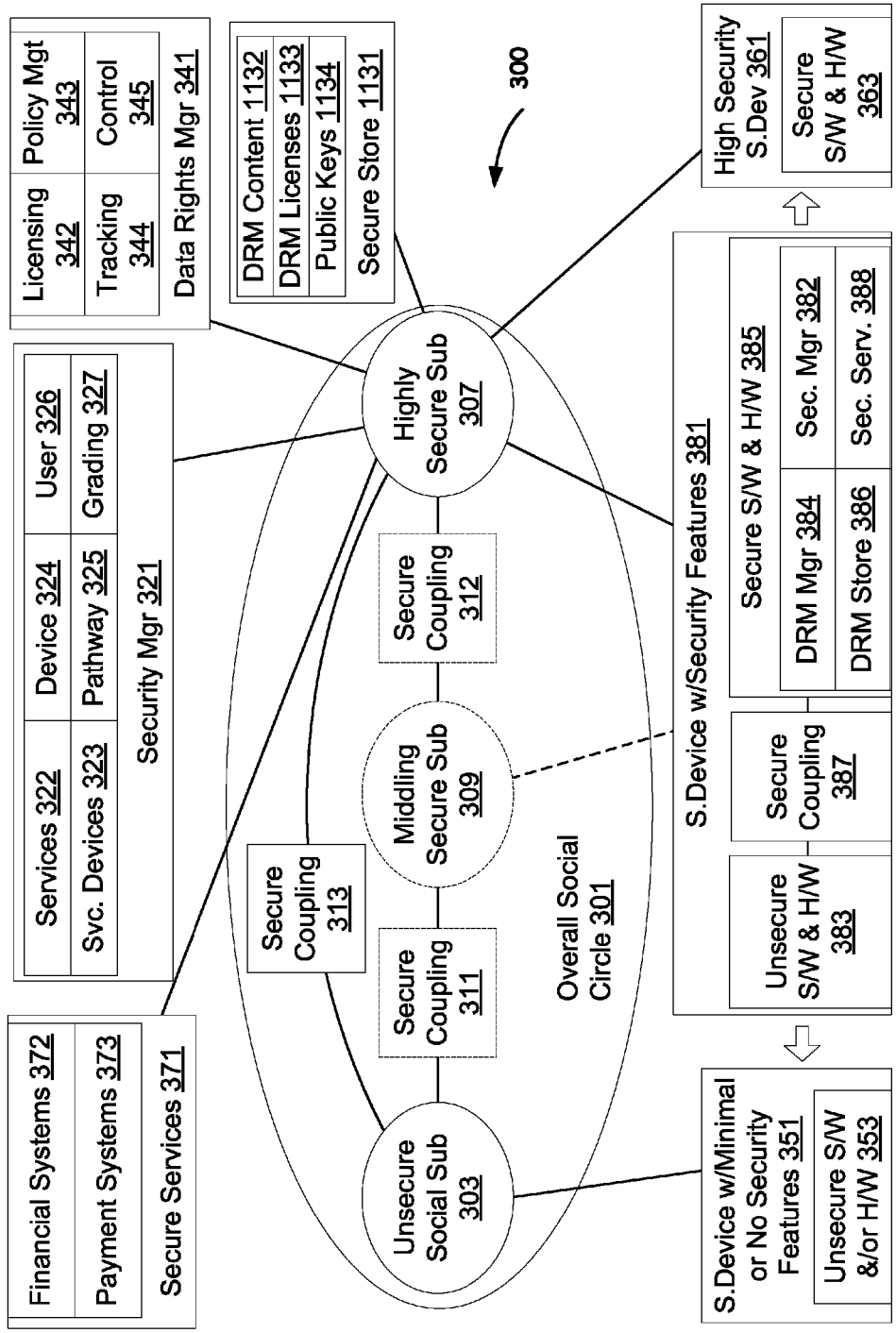
FIG. 3 is a block diagram illustrating docking of devices and services to a social circle based on security characteristics, according to various embodiments of the present disclosure.

Referring next to FIG. 3, a system 300 illustrating various social devices and social services docked in a social circle at various levels of security is discussed according to embodiments of the present disclosure. System 300 includes secure services 371, security manager 321, data rights manager 341, secure store 331, high-security social device 361, which includes secure hardware and software 363, social device 381, which has both a secure portion and an unsecure portion, and social device 351, having minimal or no security features. These devices and services are docked to social circle 301, based on their security characteristics, to highly secure sub circle 307, middling secure sub circle 309, or unsecure sub circle 303. More than three different levels of security can be implemented in social circle 301, and sub-security levels can also be implemented. Devices and services can also be docked to social circle 301 based on a trust level of the device, which in some instances, takes into account device security characteristics.

In some embodiments, devices docked in a particular sub circle, such as unsecure social sub circle 303, have access to, and are provided awareness of, only other devices and services docked to the unsecure social sub circle 303. Thus, even though high-security social device 361 is docked to highly secure sub circle 307, social device 351 may be unaware that high-security social device 361 is docked in social circle 301, because social device 351 does not have a sufficient security level or desired security characteristics. In other embodiments, any device docked to social circle 301 may be aware of other docked devices and services, but be denied access.

One or more mechanisms or procedures can be provided to allow unsecure devices, such as social device 351, to achieve a higher security level than would otherwise be possible based only on the security features of social device 351. For example, if a secure browser or browser plug-in is installed on social device 351, social device 351 can be allowed to dock, at least temporarily, to middling secure sub circle 309, thereby allowing content protected at a middling level of security to be consumed by social device 351.

In some implementations, a device or service docked in a particular security level or sub circle of social circle 301 has access to and awareness of substantially all social devices and services docked to social circle 301 at the same or lower level of security. In various embodiments, some or all of the functionality illustrated in FIG. 3 can be implemented in an SNET host, or distributed among and between various SNET hosts and social devices making up social circle 301.

The lines joining the sub circles within overall social circle 301, illustrate lines of communication between devices and services docked in one sub-circle and those docked in another. For example, a device docked in highly secure sub circle 307 can access a device or service docked in middling secure sub circle 309 by using secure coupling 312. Secure coupling 312 provides the ability to maintain separation between security levels. Likewise, middling secure sub circle 309 is communicatively coupled to unsecure social sub circle 303 via secure coupling 311, and highly secure sub circle 307 is coupled to unsecure social sub circle 303 via secure coupling 313. Secure coupling 311, 312, 313, can include devices such as routers, gateways, wireless access points, hardware and software firewalls, or the like. In some embodiments, and as discussed further in subsequent figures, overall social circle 301 can be implemented in a single device having secure software or hardware interfaces between the various security levels of sub circles, and secure coupling 311, 312, at 313 can include secure software application program interfaces (APIs), secure hardware interfaces, or a combination thereof.

Secure services 371 is docked to highly secure sub circle 307, and includes financial systems 372 and payment systems 373. Financial systems 372 can include, for example, on-line banking and investment services. Payment systems 373 can include credit card processing systems, PayPal, check cashing system, and various other systems that allow payment to be made electronically. Numerous other secure services (not illustrated) can also be included in secure services 371, for example, credit reporting services and the like. Secure services 371 is not limited to traditional services or systems, but can also be used to implement inter-circle and intra-circle billing and cost sharing systems, some of which are related to content provision and consumption. An example of another non-traditional secure service is an SNET shared account. SNET members can contribute money to the account, via membership dues, on-demand payments, or the like, to buy credits that can be used for content license fees. The SNET can purchase a bulk license to desired content using money from the group account. The bulk license may be less expensive than buying individual licenses to the content. Secure Services 371 can be used in conjunction with the tracking module 344 of data rights manager 341 to implement and enforce billing, refunds, credits, rewards, and charges related to consumption of content my other services or devices docked to social circle 301.

Data rights manager 341 is docked to highly secure sub circle 307, and can include modules and circuitry to implement functionality and services related to data rights management. For example, data rights manager 341 includes a licensing module 342, a policy management module 343, a tracking module 344, and a control module 345. Licensing module 342 can be used to determine whether a particular social device, type of social device, social device user, class of user, or the like, is licensed to receive a particular type, item, or instance, of protected content. For example, data rights manager 341 may determine that license to a particular content item allows for a given number of concurrent instances of that content item to be in existence within social circle 301 at any time. The license might also specify, for example, that any social device docked in highly secure sub circle 307 is allowed to receive protected content without requiring watermarking, tagging, transcoding, or the like, while any device docked to unsecure social sub circle 303 is not permitted to receive protected content unless the content is first watermarked and transcoded.

Data rights manager 341 also includes a policy management module 343, which is used to implement social circle 301's DRM policy. Note that policies implemented by policy management module 343 may not coincide exactly with licensing requirements implemented by licensing module 342. For example, licensing module 342 may determine that any device docked to highly secure sub circle 307 is automatically granted a license to consume a particular item of content, assuming that no more than four instances of the content are being consumed concurrently, but the policy management module 343 can implement a policy, specific to social circle 301, that permits only a certain class of devices to access content, despite the fact that the license is not limited to a particular class of devices. Thus, policy management module 343 might determine that only handheld wireless devices connected to the highly secure sub circle 307 through a particular wireless carrier are authorized to access the particular item of content, even though licensing module 342 enforces no such prohibition.

Tracking module 344 can be used in conjunction with watermarking, tagging, or the like, to track content for billing, license enforcement, policy enforcement, security monitoring, or the like. For example, if a license grants social circle 301 the ability to provide a content item to its members a limited number of times, tracking module 344 can be used to determine the number of times a particular content item has been delivered to members of social circle 301 by incrementing, or causing to be incremented, a tag value appended or otherwise included in a content file each time an instance of the content item is provided to a member of social circle 301. Likewise, if there is a cost associated with providing a content file to a member, tracking module 344 can be used to monitor the content file, and provide information about the provided content to a billing system so that the appropriate member of social circle 301 can be credited or billed appropriately.

In various implementations, a device consuming content automatically reports the consumption to tracking module 344 at the time of consumption. In some instances, for example, when consumption occurs offline, a report can be sent to tracking module 344 at the time a device docks with social circle 301, or upon any connection to a network communicatively coupled to data rights manager 341.

Control module 345 can be used in conjunction with tracking module 344 to enforce licenses and policies, as determined by licensing module 342 and policy management module 343. For example, if it is determined by data rights manager 341 that a device docked to middling secure sub circle 309 is permitted to receive content, but not allowed to retransmit the content, tracking module 344 can be used to identify a tag or watermark included in a content file, where the tag or watermark indicates the limitation on retransmission. Prior to being allowed to transmit a file, a social device docked to middling secure sub circle 309 can be required to clear the retransmission with data rights manager 341. Control module 345, based on the tag or watermark detected by tracking module 344, can grant or deny permission for the retransmission.

Additionally, control module 345 can be used retract permissions whenever a device is connected to the Internet, or another network communicatively coupled to data rights manager 341. For example, assume that a formerly authorized member device has receive content while docked to highly secure sub circle 307, but based on a lack of recent interaction between the device and social circle 301, the security rating of the device is downgraded. If the device later attempts to dock with social circle 301, or connects to a network accessible to social circle 301, control module 345 can instruct the data rights manager to revoke the previously granted DRM rights. In a similar manner, licensing module 342 can revoke or update licenses, and policy management module 343 can push new or updated policies to social devices, or revoke old policies stored on social devices.

Secure store 331 is also docked in highly secure sub circle 307, and can be used to store DRM content 332, DRM licenses 333, public keys 334, or other types of information for which secure storage is desired or required. DRM content 332 can include audio video files, software programs, applications, documents, pictures, or any other type of content subject to DRM protection. DRM content 332 may also include pointers, links, addresses, or other information, such as circle identifiers, SNET identifiers, and the like, which can be used to find DRM content stored at other locations.

DRM licenses 333 can include one or more licenses associated with DRM content 332, or with DRM content stored on another social device. DRM licenses 333 can also include a license granting a number of devices or users permitted access DRM protected content, a number of license keys that can be provided to requesters, and in some cases specify the type of encoding or encryption to be used. For example, if a requestor is authorized to receive delivery of DRM protected content by data rights manager 341, but the requester does not have a required license to playback or install the DRM protected content, the data rights manager 341 can instruct secure store 331 to deliver the necessary license or key to the requestor. In some embodiments, if there is a cost associated with the license key, payment via payment systems 373 may be required prior to secure store 331 delivering the license key to the requestor. DRM licenses 333 may also include an SNET element identifier, which can be used to automatically (possibly subject to billing requirements) grant a content license to any destination or requesting device that is a member the particular SNET circle.

Also docked to highly secure sub circle 307 is security manager 321, which can be used to interrogate and verify the ongoing security of devices, services, and users by employing challenges, biometric information, typing patterns, and other similar techniques. Security manager 321 includes services module 322, device module 324, user module 326, service devices module 323, pathway module 325, and grading module 327. Services module 322 can be used to establish, verify, and monitor a security characteristics, e.g. a security level, assigned to a particular social service. So, for example, when a social service request docking in the social circle 301, services module 322 can be used to determine whether the service should be docked to unsecure social sub circle 303, middling secure social sub circle 309, or highly secure sub circle 307. Likewise, device module 324 can be used to assign, verify and monitor a security level assigned to social devices, and user module 327 can be used to assign, verify, and monitor a security level assigned to a particular user based on various security characteristics. Each of the various modules in security manager 321 can also provide a listing of other devices or services available for each different security sub circle, and can be used to store information about availability of those services and devices, trust levels associated particular services or devices, and the like.

Service devices module 323 can be used to assign, verify, and monitor the security of devices implementing social services, collect statistics on the availability of devices hosting services, maintain associations between particular devices and services those devices can provide, and notify docked devices and services about which device should be contacted to obtain a particular service. Pathway module 325 is used to assign, verify and monitor the security of various presentation pathways through which shared content can be transferred, and can be used in conjunction with service devices module 323 to route requests for particular services, via selected presentation pathways, to an appropriate device hosting those services. Pathway module 325 can also be used to ensure that content requiring a particular level of security is routed via a properly secured pathway to the appropriate endpoint device. A properly secured presentation pathway can include pathways that use of firewalls, virtual private networks, DRM encoding, or the like. In various embodiments, a presentation pathway includes pathways internal to a device. In some instances, where no suitable secure pathway exists, security manager 321 can override a decision made by data rights manager 341 to provide unprotected content, and force content to be transcoded, watermarked, or otherwise provide reduced quality content due to a lack of pathway security. Grading module 327 is used to assign security or trust grades in support of the other modules and security manager 321, or to determine an overall grade to be assigned based on a particular requested transaction or transfer of content.

In various embodiments, grading module 327 assigns a grade to a device, user, service, or pathway based on software security, hardware security, user trust levels (including previous user interactions with the social network), and pathway security. Consider, for example, a social device, such as high security social device 361, owned by a trusted user that has secure hardware and software 363, and a secure pathway connection to social circle 301. In at least one embodiment, security manager 321 will assign this device to highly secure sub circle 307, based on the grades assigned by grading module 327 to the device, the user, and the pathway. But security manager 321 might assign an identical device (not illustrated), connected via a pathway that pathway module 325 indicates is unsecure, to a lower security sub circle, for example middling secure sub circle 309. Thus, even if a social device has secure hardware and software, it might not be docked at the highest possible security level based on other factors.

Grading module 327 can adapt a grade assigned to a user, device, service, or pathway on an interactive basis, moving the grade up or down based on changing circumstances. For example, if a pathway that was formerly insecure is secured by using a VPN, the grade for the pathway can be upgraded to indicate the additional security. If a device reports that its subscription to virus definitions is no longer current, the grade assigned to that device can be temporarily downgraded, until the problem is fixed. If users report security issues with a particular service, e.g. viruses included in requested content, poor quality content, lack of responsiveness, or unrecognized billing charges, grading module 327 can downgrade the security grade assigned to that particular service. In some instances, grading 327 can provide correlation between various security issues to identify non-reported issues. For example, if a service has security problems, the real issue may be a pathway or one of multiple different devices used to host the service.

When grading module 327 downgrades the security rating of a device, the user can receive a notification indicating that a downgrade has taken place. The notification can include a reason for the downgrade, and also a list of corrective actions that can allow reinstatement (or even improvement) of the previous security rating. In some instances, the user can simply renew a virus subscription, download a software patch, properly respond to a challenge, interact with a biometric sensor, change a password, update a shared key, change a communication mode, or local security preference, or the like.

Some social devices can be docked in two different security sub circles, depending on the hardware and software configuration of the device. Consider social device 381, which is capable of operating in both a highly secure mode and a middling secure mode due to a security partition. Social device 381 includes two partitions: a secure hardware and software partition 385, and unsecure hardware and software partition 383, which are connected to each other across the security partition by via a secure coupling 387. Secure hardware and software partition 385 can be docked to highly secure sub circle 307, while the unsecure hardware and software partition 383 can be docked to middling secure sub circle 309. The secure hardware and software partition 385 supports a presentation pathway that includes either or both of middling secure sub circle 309 and highly secure sub circle 307, but the unsecure hardware and software partition 383 is prevented from accessing content from social circle 301, except via a presentation pathway that includes unsecure social sub circle 303.

In the illustrated embodiment, secure hardware and software 385 includes a DRM manager 384, a security manager 382, DRM storage 386, and secure services 388, each of which can be used to implement the same or similar functionality as DRM manager 341, security manager 321, secure storage 331, and secure services 371. Secure coupling 387 performs much the same function as the secure couplings 31, 312, and 313, preventing the highly secure hardware and software 385 from being compromised by unsecure hardware and software 383.

In some embodiments, the secure hardware and software 385 can provide backup functionality for other social devices used to implement DRM manager 341, security manager 321, secure storage 331, and secure services 371. In yet other embodiments, DRM manager 384, security manager 382, DRM storage 386, and secure services 388 are used to realize a separate sub circle of overall social circle 301, with the separately realized sub circle including its own separate security levels, each of which may have different security characteristics.

Figure 4:
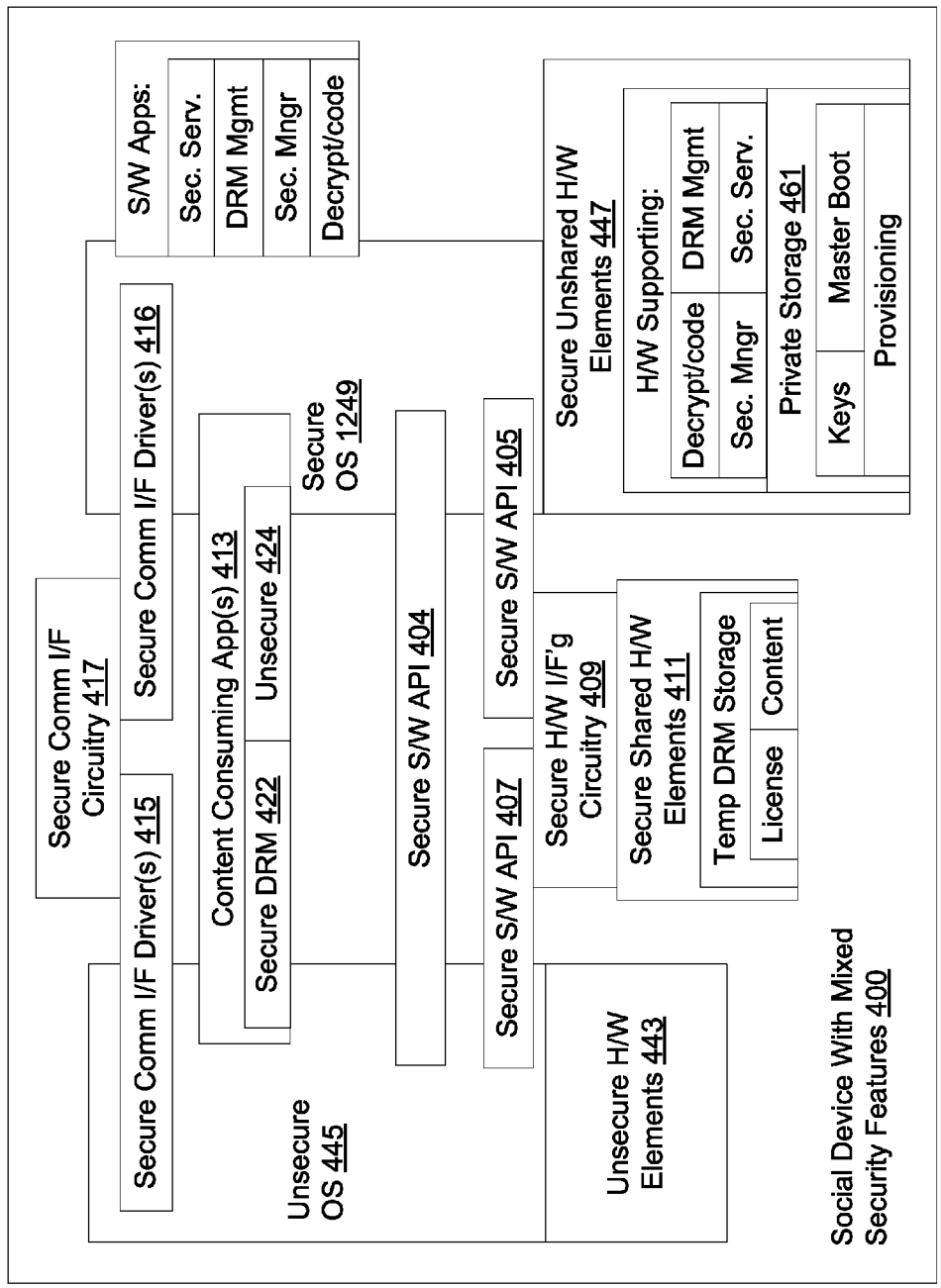
FIG. 4 is a block diagram illustrating a social device having both secure and unsecure portions according to various embodiments of the present disclosure.

Referring next to FIG. 4, a social device 400 including mixed security features is illustrated and discussed according to various embodiments of the present disclosure. Social device 400 can be contained within a housing such as a set top box, a wireless phone, a tablet computer, a server box, a NAS storage device, a gateway, access point, or other device used to implement a social network or docked to a social network. Social device 400 includes both secure and unsecure elements, each of which can be included in presentation pathways when docked to a corresponding security circle within an overall social circle. For example, unsecure operating system 445 and unsecure hardware elements 443 can be used to run, install, and access applications, services or content, such as publicly available software and public domain content that requires little or no DRM protection. When social device 400 is running in an unsecure mode, secure communications interface circuitry 417 and secure communication interface drivers 415 and 416 prevent unsecure operating system 445 and unsecure hardware elements 443 from accessing the secure portion of social device 400.

The highly secure portion of security device 400 includes secure operating system 449 secure hardware elements 447. The secure operating system 449 and the secure hardware elements 447 are separate from, and unshared with, the unsecure operating system 445 and hardware components 443, thereby permitting protected content to be downloaded, executed, viewed, or otherwise operated upon while still maintaining a security level dictated by a data rights manager, or as otherwise established by an SNET or SNET circle. Secure unshared hardware elements 447 can include hardware that supports or implements decoding and decryption, DRM management, secure services, and a security manager, the functionality of which has been previously discussed.

Secure unshared hardware elements 447 can also include private storage 461, implemented in segmented or otherwise protected memories, which can be used for storing information such as public and private keys, circle keys, SNET keys, licensing keys, master boot firmware, provisioning firmware and software, or the like. By preventing unsecured portions of security device social device 400, from accessing the secure hardware elements 447, the security of the secured portion can be more easily maintained by preventing unauthorized or undetected tampering. For example, the secure, unshared hardware elements 447 can include secure interfaces, such as secure hardware interfacing circuitry 409. Tamper proofing and detection devices can also be used to help ensure hardware integrity, for example, by identifying security breaches within a housing, or rendering private storage unusable if physical access to the private storage internal workings is obtained. In some embodiments, tampering alters the functionality or data stored in secure hardware elements 447 without rendering the hardware unusable, for example, by automatically setting particular bits in the memory to a desired value if tampering is detected, or deleting certain keys or other portions of the memory in response to detection of tampering. In some embodiments, tamper detection for secured hardware elements 447 can be implemented by automatically sending a tamper indication to a social network host in response to tampering being detected.

The secure portion of social device 400 can also include secure software applications, which can be used to implement secure services, e.g. billing; DRM management services, e.g. determining, configuring, and enforcing DRM security protocols and procedures; a security manager function, which can be used to perform various self monitoring and other security functions; and decryption, decoding, encryption and encoding. In some embodiments, the secure software can be loaded into secure memories during manufacture of security device 400, and require a secure update procedure to be performed by an authorized technician. In some cases, secure software applications can be installed or updated by providing an authorization code to an owner of social device 400 via a social network to which social device 400 is docked. The secure software can, in some cases, be managed by a social device host or secure social device.

In general, secure software is executed using the secure operating system 449. This allows sensitive content requiring high security, to be played back, installed, or accessed using the secure portions of social device 400. So, for example, a social device with mixed security features can execute, install or access protected content using secure operating system 449 and secure unshared hardware elements 447, thereby preserving the security of the content. Also generally, content can be accessed, installed, executed, or played back using unsecure operating system 445 and unsecure hardware elements 443 if the content is tagged, watermarked, transcoded, or otherwise has safeguards included in the content itself. At least in part because the two portions of social device 400 remain separate, content can be provided to social device 400 using a first level of security suitable for highly secure content, despite the fact that portions of social device 400 may not be secure enough to receive the same content.

To help maintain the separation between the secure, unshared portions of social device 400 and the unsecure portions, secure operating system 449 and unsecure operating system 445 interface with each other via secure interface communications circuitry 417 and secure communication interface drivers 415 and 416. The secure communication interface circuitry 417 and drivers 415 permit one-way access by secure operating system 449 to unsecure operating system 445, thereby allowing the secure portion social device 400 to receive services and use general communications or other processing resources available in social device 400 without requiring that the entire social device 400 be secured.

Secure operating system 449 can also communicate with unsecure operating system 445 via a secure software APIs 404, 405, and 407. Secure software API 404 can be run on top of secure OS 449 using secure, unshared hardware elements 447, and allow unsecure OS 445 to send requests to secure OS 449 and to respond to requests from secure OS 449. In other embodiments, secure software API 407 and secure software API 405 are executed by shared hardware interfacing circuitry 409, resulting in communications between secure OS 449 and unsecure OS 445 being handled by shared secure shared hardware element 411. Secure shared hardware elements 411 can include temporary DRM storage for licenses, and temporary storage for protected content. Although secure shared hardware elements 411 may not be as strictly secured as unshared secure hardware elements 447, similar security measures can be employed to prevent and detect tampering.

Social device 400 can be implemented in various different hardware nodes, regardless of whether the node is a requesting device, a receiving device, or an intermediate node through which protected content will be transferred. In some embodiments, social device 400, through the shared secure hardware elements 411, can be authorized store content that is watermarked tagged or otherwise protected, and secure software application interface 407 allows playing of the secure content stored in the shared secure hardware elements 411, although the unsecure operating system may not be authorized to retransmit content stored in the secure shared hardware elements 411.

Consider the following example of social device 400 in operation. A user of social device 400, which is a wireless tablet device in this example, desires to view a newly released movie. Assume for purposes of this example that unsecure portion of social device 400 is docked to a middling security level of an SNET, and that the middling security level will allow a maximum resolution playback of the movie for a period of 1 day, so long as an appropriate license is purchased. Also assume that the secure portion of social device 400 is docked to a highly secure sub circle of the SNET. Social device 400 sends a request to a movie delivery service, which is docked to the same highly secure sub circle as the secure portion of social device 400. The secure OS 449 sends encrypted messages, via secure communication interface circuitry and drivers 416, 417, and 415 to an SNET host providing the services illustrated in FIG. 11. The SNET communicates with secure OS 449 to arrange billing for the movie, and sends the necessary license key to secure OS 449. Software applications running on secure OS 449, and using unshared hardware elements 447, handle the billing, decryption, DRM management, and the like.

Secure OS 449 sends the necessary license keys to temporary DRM storage in secure shared hardware 411, Secure OS 449 can also obtain the protected content from the movie service using the license key provided by the SNET host. Once the content and key are stored by shared hardware elements 411, the secure OS 449 sends the unsecure OS 445 a message via secure software API 404 indicating that the license key and content are present.

Unsecure OS 445, using secure software API 407, obtains the license key from Temp DRM storage, and using secure DRM content consuming application 422, retrieves and plays back the content stored in temporary DRM storage. In at least one embodiment, the content stored in Temp DRM storage is stored in an encrypted format, and the secure DRM content consuming application 422 can use the DRM license key to decrypt the content for playback. Secure software API 407 can be configured to prevent unsecure OS 445 from writing to temp DRM storage, thereby preventing corruption of the stored content, removal of tags and watermarks, etc. Furthermore, secure DRM content consuming application 422 can be configured to essentially stream the content from Temp DRM storage, thereby making it more difficult to redistribute protected content.

Unsecure OS 445 can use unsecure content consuming application 1224 to request, configure, and playback unsecured content without interacting with either shared secure hardware 411, or secure unshared hardware elements 447. Note that content consuming applications 413 can be run on either or both secure OS 449 or unsecure OS 445.

Figure 5:
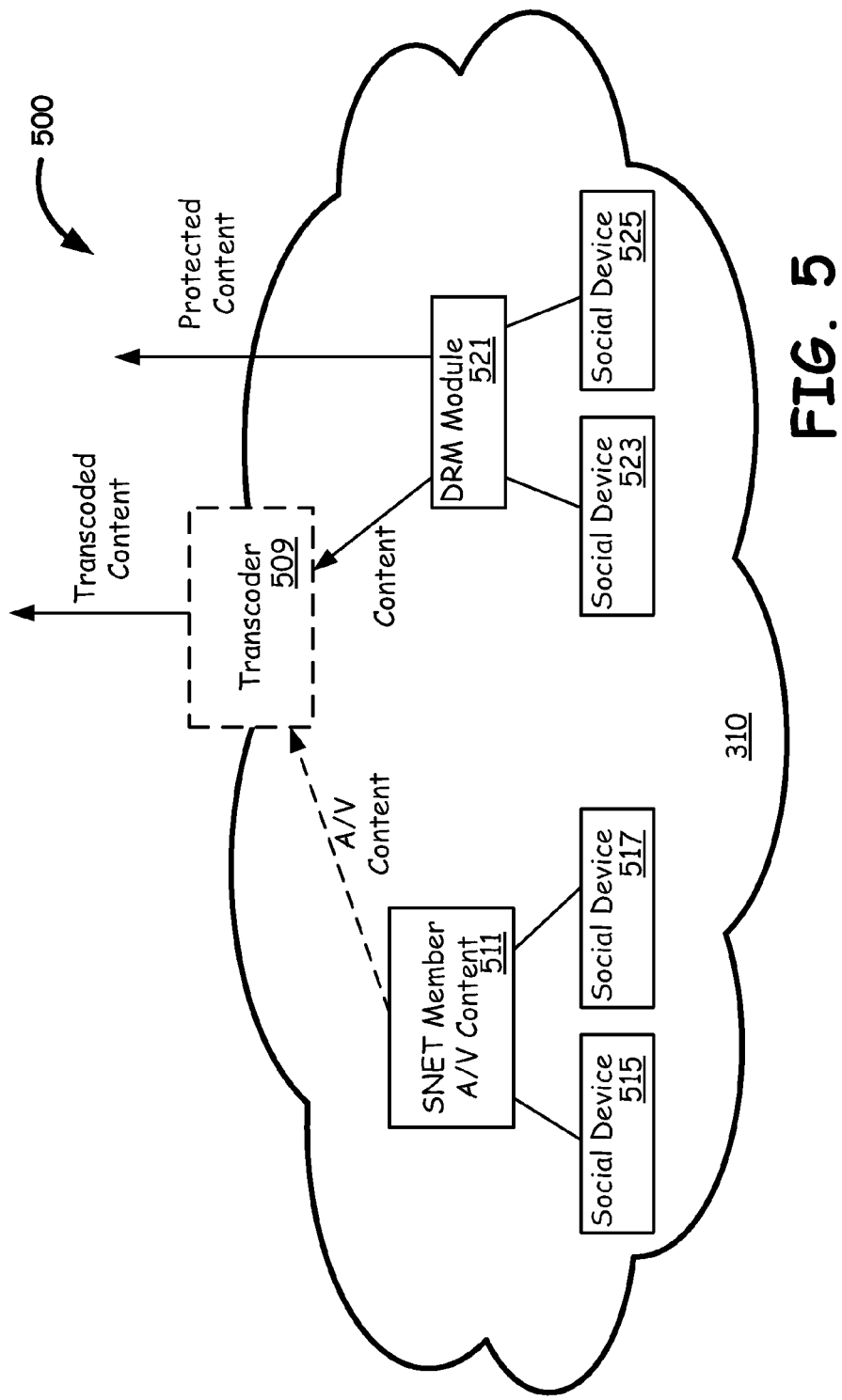
FIG. 5 is a schematic block diagram illustrating accessing protected content stored in a social device participating in a social network circle/sub-circle in accordance with embodiments of the present disclosure.

Referring next to FIG. 5, a social network circle 500 including devices connected via a communication network 510 is illustrated and discussed according to various embodiments of the present disclosure. Social network 500 includes a social network member 511 that has access to A/V content either locally or through other social devices, such as social devices 515 and 517. Also included in SNET 500 are DRM module 521, social devices 523 and 525, and transcoder 509 for use in transcoding content being transmitted outside of social networks 500 in accordance with various content protection parameters established by DRM module 521, in accordance with access policies and preferences associated with membership in SNET circle 500, in accordance with limitations associated with particular content, user preferences or SNET preferences, as directed by an SNET host, or some combination thereof.

In some embodiments, content can be watermarked in addition to, or in place of, transcoding. Watermarking can include identification by human requestor, human recipient, requesting device, destination device, time and date, content source, author, title, or some combination of these. The content can be watermarked prior to storage, at the time of storage, during storage, or at the time content is delivered. In cases where watermarking is performed during or just prior to delivery of the content, the watermarking can be performed prior to, after, or during transcoding of the content. The watermarking can be used to identify a particular device, an SNET circle, a member, a content provider, and/or a pathway, to aid in tracking a distribution history of the content. Regardless of the actual social device storing or providing the content, watermarking can be performed by the device itself, by transcoder 509, by DRM module 521, or by another social device or SNET host offering a watermarking service.

Transcoder 509 can be implemented as a service available to some or all members or docked devices associated with SNET circle 500. Transcoder 509 can be a dedicated transcoding device, a member device, an SNET host. DRM Module 521 can be implemented as part of a media playback device docked with SNET circle 500, as part of a member device, as part of an SNET host, or as part of third party service available to members of SNET circle 500. SNET member A/V content can be implemented in a dedicated storage device or other device having access to sufficient storage resources, such as a media playback device that can obtain content from optical or magnetic storage media, from the Internet, from a content provider, or the like.

When a request for content is received from outside of SNET circle 500, a determination can be made regarding whether or not the content is to be delivered, and if so what level of content protection to apply. Thus, if social device 523, which is a member of SNET 500 has access to the requested content, social device 523 can send the requested content to DRM module 521 for appropriate encoding in accordance with various digital rights management standards, preferences associated with SNET circle 500, content, users, destination devices, requestors, or the like. If DRM module 521 determines that the content is not to be transmitted outside of SNET circle 500 without first transcoding the content, DRM module 521 can instead provide the content to transcoder 509, which can provide a lower quality version of the content in accordance with content correction parameters associated with SNET circle 500. Some embodiments provide for multicasting of content between or within SNET circles. Furthermore, DRM module 521 can, in some instances, instruct another device or service to deliver content to transcoder 509 for processing.

In some cases a member of SNET circle 500 may have established preferences to limit distribution of content outside of SNET circle 500. For example, a preference associated with particular content may specify that content obtained from social device 515 or 517 is permitted to be distributed with a low level of content protection if the content is requested by or being delivered to a device within SNET circle 500, and to external devices or requestors possessing a threshold level of trust. In some embodiments, the content, for example audio video content, can be delivered to transcoder 509, which transcodes the content as needed to comply with security settings and preferences associated with the requestor, device, and content. In other embodiments, a device providing the content can used to implement at least a portion of the content security measures used to provide a selected level of content security.

Some of the SNET security measures included in particular security levels include, but are not limited to, limiting the ability to consume, use, or access particular content or types of content once or N times, date range limitations, and allowing access only so long as a device remains a circle member. The security features can be implemented at a content level, device level, or feature level. Other security controls may include verification of a social device, email, telephone number, etc.

When content is authorized for transfer outside of SNET circle 500, the content can be tagged prior to being transmitted. For example, the tag could indicate a number of copies allowed to be made of the content, or a number of times the content can be viewed or accessed. The tag could include an identifier indicating the source of origin of the content, including the circle or specific device that transmitted the content. In some cases, an SNET circle can help enforce content protection schemes by preventing retransmission of the content by verifying with the original SNET circle whether retransmission is allowed to a third SNET circle.

Further security for protected content can be achieved in some implementations by providing for the use of selectable levels of DRM protection upon uploading or otherwise making available content to an SNET circle, and by allowing the person uploading the content to select the type of transcoding to be performed by transcoder 509. For instance, a high quality original work can be transcoded to a lower quality format and can be configured to expire after a particular period of time. The uploaded file can then be posted for sharing. The protected file also can be linked to or otherwise identify a high quality source file—e.g., for purchase on a commercial site. That way an artist can advertise through sharing and sell through a different outlet, such as iTunes.

Figure 6:
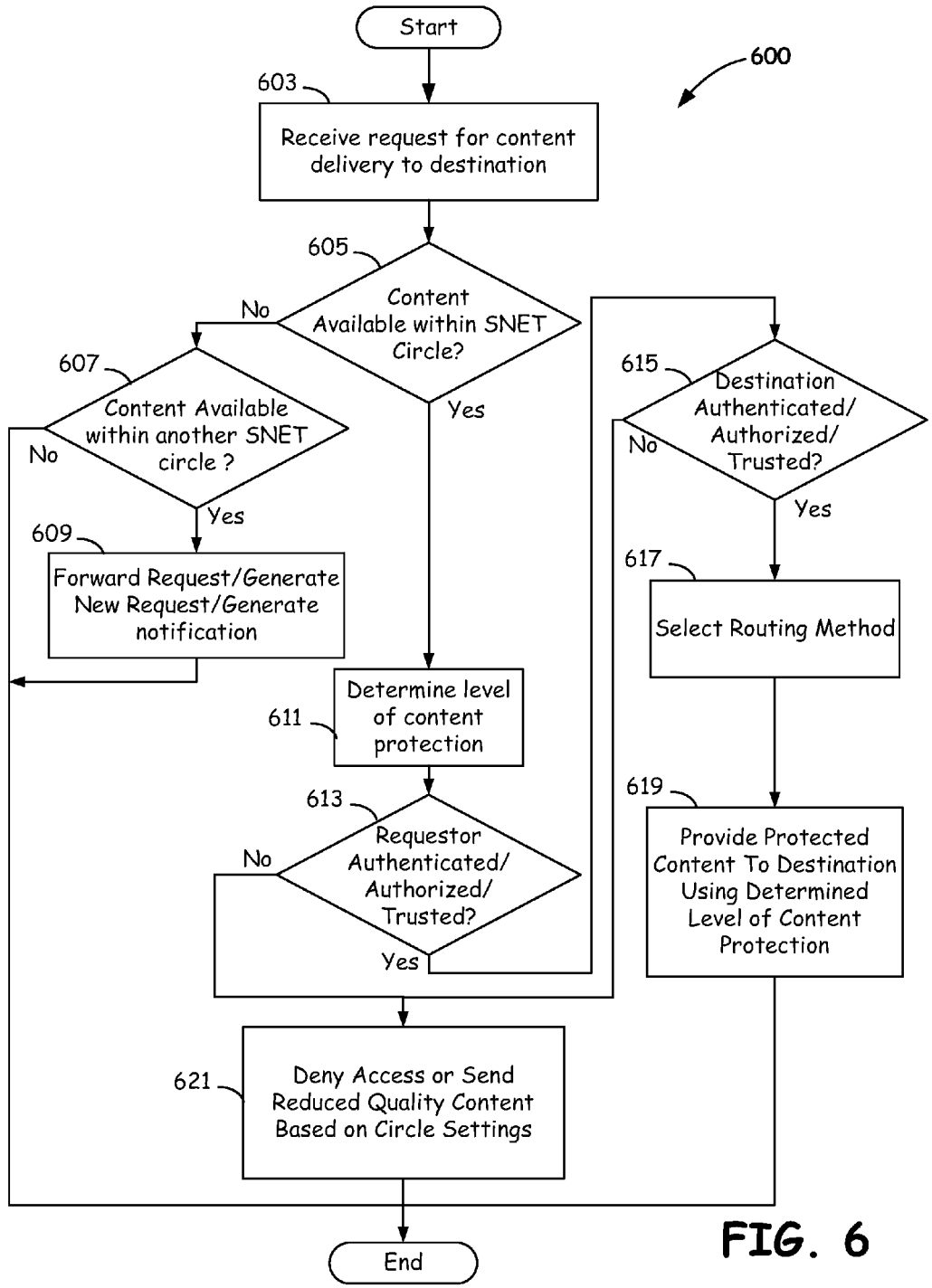
FIG. 6 is a flow diagram illustrating a method of protecting shared content using various different levels of content security according to embodiments of the present disclosure.

Referring next to FIG. 6, a flowchart illustrating a method 600 is discussed according to various embodiments of the present disclosure. At block 603, a request is received for content delivery to a destination device. The request can be for delivery to the same device requesting the content, or to a different device. The request can also be for delivery of content either within the SNET circle providing the content, within an SNET but outside the circle providing the content, or from outside the SNET.

As illustrated at block 605, a determination is made about whether the requested content is available within the SNET circle. Determining whether the requested content is available can include determining both whether the content is available from the device receiving the request, and whether the requested content is available from a different device within the SNET circle. As illustrated by block 607, if content is not available within the SNET circle a check is performed to determine if the requested content is available from within another SNET circle within the same SNET. If the requested content is not available from the SNET circle or from another circle within the SNET, method 600 ends. In some embodiments, although not specifically illustrated by method 600, a response can be sent to the requestor indicating that content is not available.

If the determination made at block 605 indicates is favorable, indicating that the requested content is available within the SNET circle from which it was requested, a level of content protection is selected, as illustrated made at block 611. The level of content protection can be selected based on preferences and statuses associated with particular content, particular destinations, particular requestors, particular combinations of destinations and requestors, or the like. For example, a first level of content protection may be applied to content delivered in response to a request by a particular requestor for delivery to a social device docked in the SNET and associated with the requestor, but a second level of content protection can be applied if delivery is requested to a device not associated with the requestor.

As illustrated by block 613, a status of a requestor is determined by checking to see if the requestor has been authenticated, authorized, and is trusted. In some embodiments, the status of the requestor is determined prior to selecting the level of content protection at block 611. If the requestor's status is unfavorable, that is to say if the requestor is not authenticated, authorized, and trusted, access to the requested content can be denied, or reduced quality content can be provided, as shown by block 621.

If the requestor is authenticated, authorized, and trusted, a status level of the destination device can be verified at block 615. Verification or determination of the destination device's status can include determining whether the requested destination is authenticated, trusted and authorized. In some instances, determining the status of the destination device includes determining a status of multiple devices in the destination path. For example, if content is to be delivered to a destination device through an intermediate device the status of the intermediate device can also be determined.

If the status of the destination device determined at block 615 is unfavorable, access to the requested content can be denied, or reduced quality content can be provided, as shown by block 621. If, however, the status of the destination device is favorable, a routing method for the requested content can be determined at block 617. In some embodiments, selecting a routing method includes determining whether the content is to be sent substantially directly to the requesting device by a content storage device, or whether the content is to be sent to an intermediate node with the same SNET circle for content protection, tagging, transcoding, or the like to be applied. Selecting the routing method can also include determining whether an SNET host will relay the content outside of the SNET or SNET circle, whether the content is to be sent via a VPN or using a firewall, and the like.

As illustrated at block 619, after the status of both the requestor and the destination device have been determined to be acceptable, the protected content is provided to the destination device using the determined level of content protection and using the selected routing method.

Figure 7:
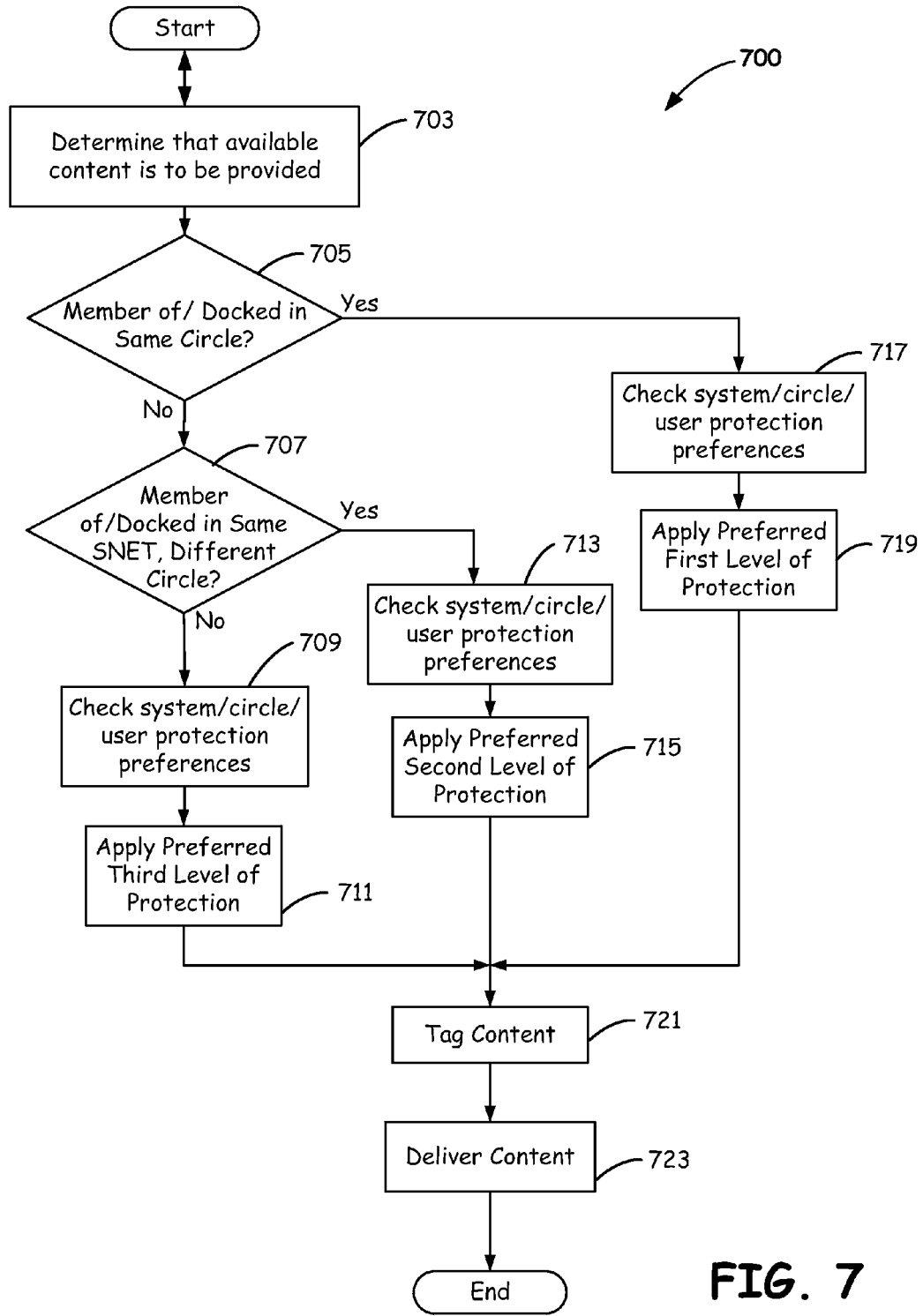
FIG. 7 is a flow diagram illustrating selecting a level of content protection to be applied to shared content according to various embodiments of the present disclosure.

Referring next to FIG. 7, a method of determining the level of content protection is illustrated and discussed with respect to method 700. Method 700 includes, essentially, three different possible decision paths. In one path, a request for delivery of content internal to an SNET circle results in a first level of content protection being applied, a request for delivery of content from outside of the circle but within the same SNET results in a second level of content protection being applied, and a request for delivery of content completely outside the SNET results in a third level of content protection being applied. Content can be tagged as part of any selected level of protection.

At block 703, a determination is made that available content is to be provided to a destination specified in a request for content received at a social device in an SNET circle. As illustrated by block 705, a check is performed to determine whether the requestor and the destination device are members of the same SNET circle as the social device from which the content is being requested.

A first decision path is chosen if the determination at block 705 is favorable, for example if either the requestor or the requested destination device is a member of the same SNET circle providing the requested content. In some embodiments a favorable determination at block 705 results only if both the requestor and the destination device are docked in, or members of, the same SNET circle as the social device handling the content request. Other embodiments return a favorable determination if the destination device is docked in the SNET circle, but the requestor is not. Yet other embodiments return a favorable determination if the requestor is a member of the same SNET circle as the social device handling the content request, even if the destination device is not.

The first decision path continues at block 717, which illustrates that a check of preferences is performed. The preference check can include a check of system preferences related to a known devices and requestors, such as blacklists or whitelists, preferences related to the use of Virtual private networks, security, trust verification levels, and the like. Other preferences that can be checked include preferences related to circle or SNET membership or docking, preferences that an owner, licensee, or other provider of the content established upon making the content available to the SNET circle, preferences and DRM requirements associated with particular instances and items of content, tags already included in the content, or the like. As illustrated by block 719, a first level of protection is selected based on the preference check and applied. The first level of content protection, in at least one embodiment, is selected to take into account that the requestor, or the destination device, is a member of the same circle from which the content is requested or provided.

A second and third decision path include block 707. As illustrated by block 707, if the determination at block 705 is unfavorable, for example if neither the requestor nor the destination device are a member of the same circle as the social device servicing the content request, a check is made to determine whether either or both the requestor and the destination device are members of the same SNET (but different circles) as the social device from which the content is being requested.

The second decision path shows that if the determination made in block 707 is favorable, protection preferences associated with SNET members who are not also members of the same SNET circle, are consulted to assist in choosing an appropriate second level of content protection. Protection preferences, like those discussed with respect to block 717, include security, DRM, user and other preferences that can be stored in an SNET host, a social device, or in a combination thereof, and be used to inform an appropriate selection of a content protection level. The preferences can include, but are not limited to, trust threshold levels, authentication information and challenge questions and answers, preferred content formats, and the like. The preferences can be user-centric preferences—for example lists of allowed users, device-centric preferences—for example a list of device types, platforms, and capabilities required before a device is approved to receive unrestricted content, membership-centric—for example all devices docked in the SNET can receive unrestricted content, or a combination—for example particular content or types of content can be delivered to particular types of devices only if the requestor is a member of the SNET. The preferred second level of content protection is applied at block 715.

The third decision path is entered if the determination made in block 707 is unfavorable, for example if neither the destination device in the requestor are members of the same SNET. As discussed above, content protection preferences are consulted at block 709, and a third level of protection is applied to the requested content before delivery, as illustrated at block 711. The third level of protection takes into account that the content is being delivered outside of the SNET.

Regardless of the level of protection applied to the content, the content can be tagged prior to delivery, as illustrated by block 721. Content can be tagged with a time to live tag, a tag limiting the number of copies, a tag limiting distribution based on circle or SNET membership, a tag identifying an original source of the content, a tag indicating an original requested destination and requestor, a tag indicating a level of protection applied to the content, or the like.

As illustrated at block 723, content with the appropriate level of content protection is delivered to the destination device. Note that although not specifically illustrated, both an original version of content and a content version produced in response to a selected security level can be delivered.

Figure 8:
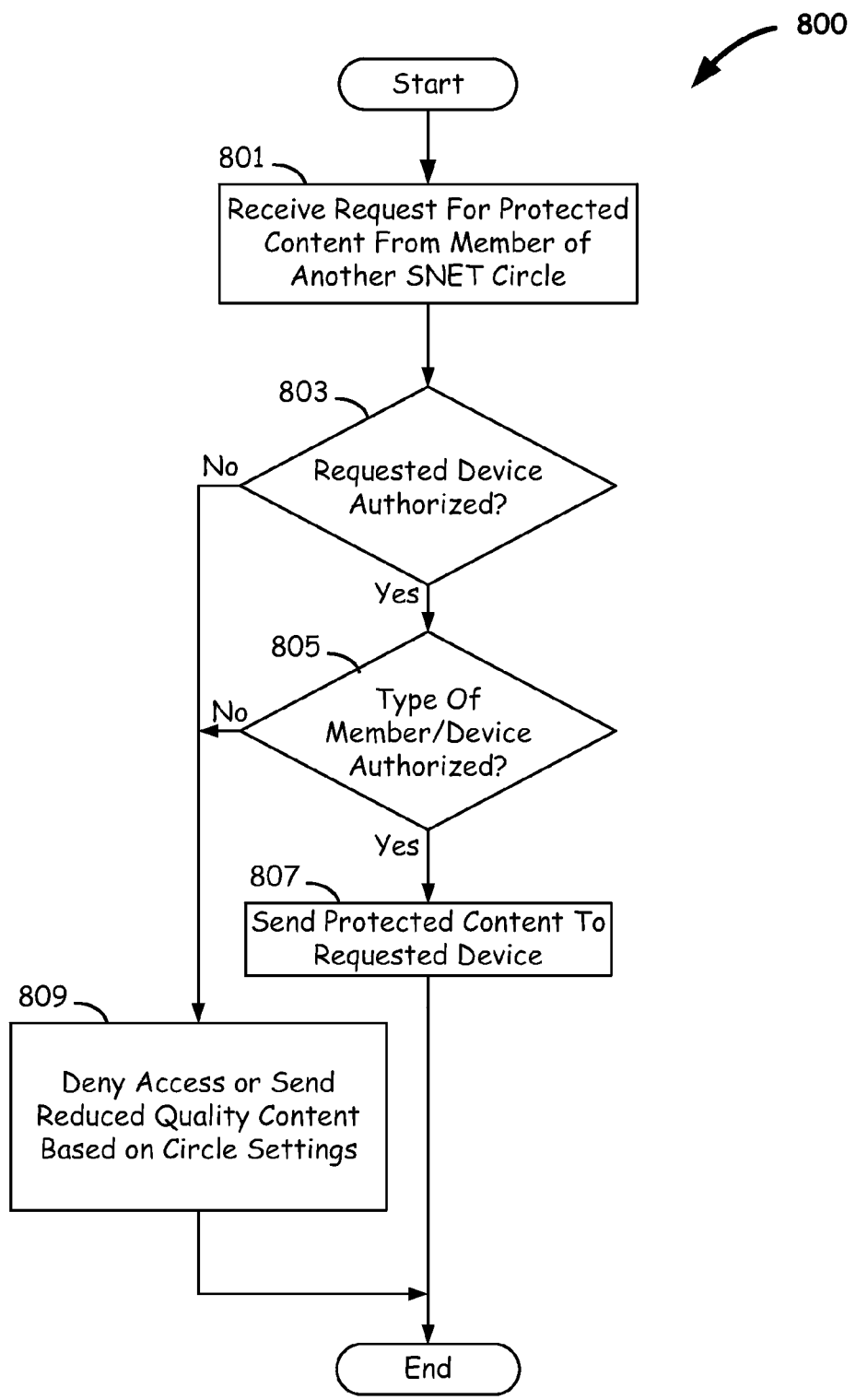
FIG. 8 is a flowchart illustrating security verification that non circle-members are authorized to receive circle-authorized content according to various embodiments of the present disclosure.

Referring next FIG. 8, a flowchart illustrating a method 800 used to verify that non circle-members are authorized to receive circle content, is illustrated and discussed according to various embodiments of the present disclosure. At block 801 a request for protected content is received from the member of another SNET circle, or an entity that is not a member of the current SNET circle. In some instances, the request can come from within the same social network, but from an SNET circle having a different level of trust. In other instances the request may come from a member of a different social network, or from a device that is not a member of any social network or social network circle. For purposes of this example, it can be assumed that the request comes from another member of the same social network but from a different SNET circle. The same or similar techniques can be used to handle requests from other sources.

At block 803, a determination is made about whether members of the SNET circle from which the request is received are authorized to access the particular resource requested. Thus, for example, if a request for audio/video content is received from an SNET circle having a trust level that is higher or equal to the trust level of the SNET circle from which the audio video content is requested, it may be determined that the requestor is authorized to receive the content simply on the basis of the requestor's membership in the other SNET circle. If members of the SNET circle from which the request for protected content is received has a lower trust level than the trust level of the SNET circle holding the protected content, access to the protected content can be denied, as illustrated by block 809.

In some applications, rather than simply denying the request, reduced quality content, or both a reduced quality version and an original version, can be delivered based on circle settings or parameters. Thus, for example, if the requestor is a member of the circle that has a limited trust rating, a reduced quality version of the protected content can be sent to the member of the other SNET circle. If, however, the requestor is a member of an SNET circle having a very low trust level, transmission of the protected content can be denied. Furthermore, method 800 can be used in conjunction with various standardized digital rights management (DRM) or other content protection standards or schemes without departing from the spirit and scope of the present disclosure.

If it is determined at block 803 that members of the SNET circle from which the request is received are authorized to receive the requested content, an additional check can be made, as illustrated at block 805, to determine whether the requestor is the type of member or device authorized to receive protected content. For example, even though members of a particular SNET circle may be authorized to receive the protected content, there may be a block on sending content to particular types of recording devices. Thus, a digital video disk (DVD) recorder that is a member of an SNET circle in which members are generally permitted to receive the protected content may still be blocked from receiving the protected content because of its device or member type.

As illustrated at block 807, if it is determined that the requestor is a member of an SNET circle authorized to receive protected content, and is also of a device or member type authorized to receive protected content, the protected content can be sent to the requesting member. To continue with the previous example, protected content may be permitted only to non-recording devices, regardless of whether circle members are otherwise authorized to receive the protected content. Thus, a television display that is a member of the same SNET circle to which the previously mentioned DVD recorder belongs, would be permitted to receive the protected content even though the DVD recorder might not be permitted to do so.

Figure 9:
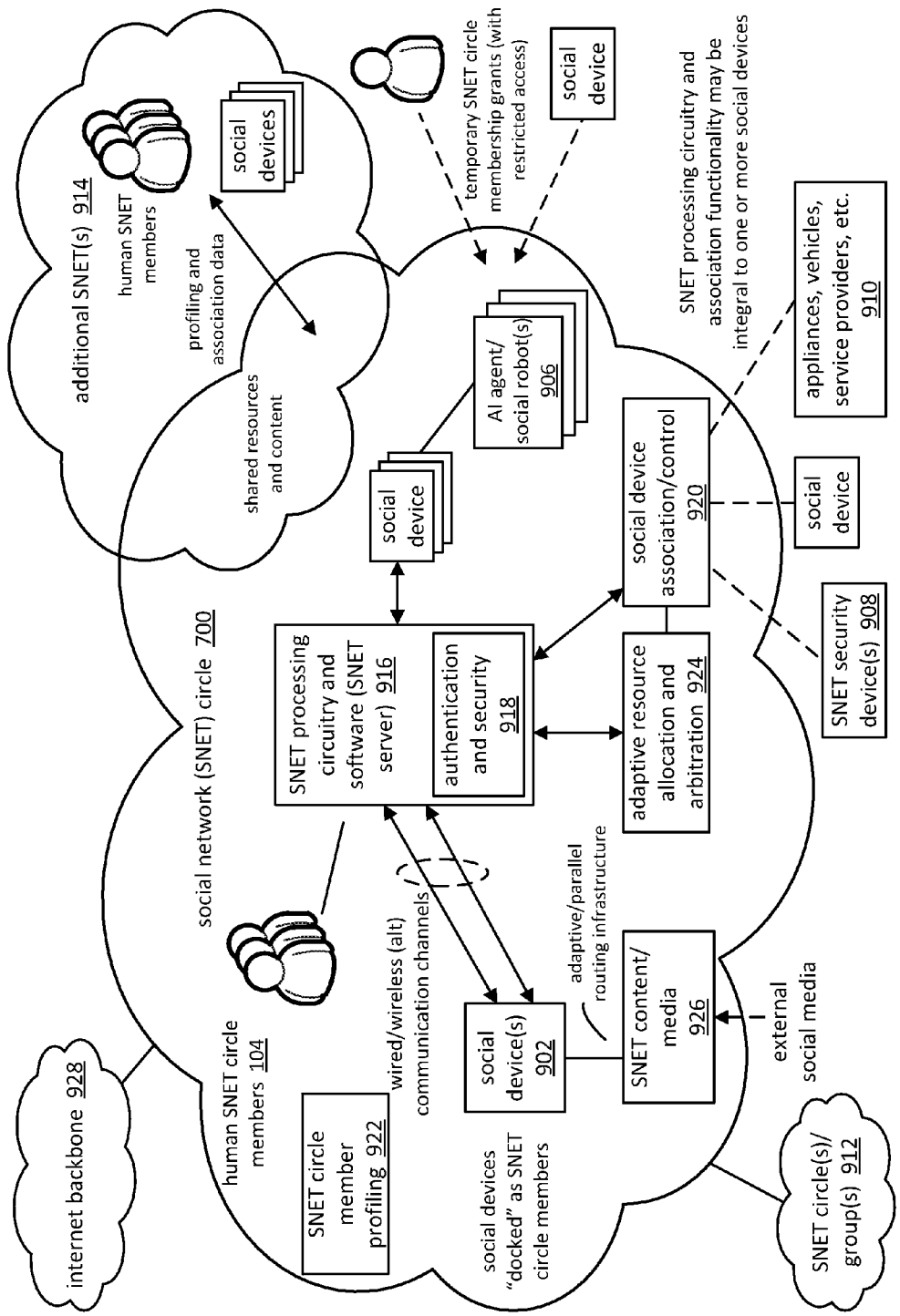
FIG. 9 illustrates a social network circle comprising social devices in accordance with various embodiments of the disclosure.

Referring now to FIG. 9, a social network circle/group 900 (hereinafter "SNET circle") suitable for implementing various embodiments discussed herein, is illustrated and discussed. Briefly, membership in the SNET circle 900 may comprise docked social devices 902 and human SNET circle members 904, as well as proxies thereof. Further, nodes in SNET circle 900 may include device services and software (e.g., applications) of various types, which participate as members. By way of example, SNET circle members might include artificial intelligence agents/social robots 906, SNET security device(s) 908, appliances, vehicles and service providers 910, common or authorized members/functionality of other SNET circles 912, etc. Further, access to specific content and resources of a SNET circle 900 may be shared with members of additional SNET(s) 914, including remote or web-based applications. Such access can be conditioned on acceptable profiling and association data. Similarly, social devices or individuals may be granted temporary or ad hoc memberships, with or without restricted access, and in some cases based on one or more levels of trust.

In the illustrated embodiment, formation, maintenance and operation of SNET circle 900 can be performed by standalone or distributed SNET processing circuitry and software 916. It is noted that the "SNET processing circuitry" may comprise hardware, software, applications, or various combinations thereof, and be configurable to support various functionalities disclosed herein. Further, the SNET processing circuitry 916 may be included in a standalone server, server farm, cloud-based resources, and/or the various types of devices described below, and incorporate authentication and security functionality 918, including various embodiments that incorporate device security and trust functionality as illustrated and described in the following figures and accompanying description. In addition, specialized middleware may also be utilized by SNETs according to the invention, including standardized middleware with an associated certification process. Interactions and interdependencies within the SNET circle 900 may involve one or more of a social device association/control module 920, SNET circle member profiling module 922, and an adaptive resource allocation and arbitration module 924 as described more fully below.

Distribution of internal and external SNET content/media 926 can be accomplished in a variety of ways in accordance with various embodiments. For example, media distribution may involve an adaptive or parallel network routing infrastructure involving a wide variety of communication protocols and wired and/or wireless communications channels. SNET content/media 926 may comprise, for example, various user-driven (advertising) channels, pictures, videos, links, online text, etc. Access to such content, as well as communications with and remote access to social devices 902 of the SNET circle 900, may occur over an Internet backbone 928, cellular communication system, WAN, LAN, etc.

SNET circle 900 facilitates sharing of content and interaction between circle members. For example, if one member of social circle 1101 is watching a movie, and another member of social circle 1101 wants to participate along with the other member SNET server 916 can be used to determine a level of allowed participation by consulting user preferences, user and device security and trust levels, content licenses, circle policies, and the like. For example, SNET server can determine that the second member is permitted to begin viewing the same movie, at the same point in the movie, just as if the second user was watching the movie with the first user in person. Being able to join a movie or other similar content already in progress can provide more personal connections via the social network. The second user might also be able to communicate with the first user via chat or text.

In another example, a user may have set notification alerts within the social network indicating that the user wants to be notified any time another user is playing a video game. SNET server 916 can be used to verify billing, access rights, and personal preferences of both users, and based on the verifications, permit the user to join the video game already in progress, and allow the two members to communicate via video/audio, or a combination thereof, so that the two users can play the game together. In some such instances, the SNET itself can hold the license to the video game, and be permitted to distribute a set number of concurrent players without additional cost. Furthermore, the security and trust verifications performed by SNET server 916 can be used to ensure that DRM protected content remains protected.

Figure 10:
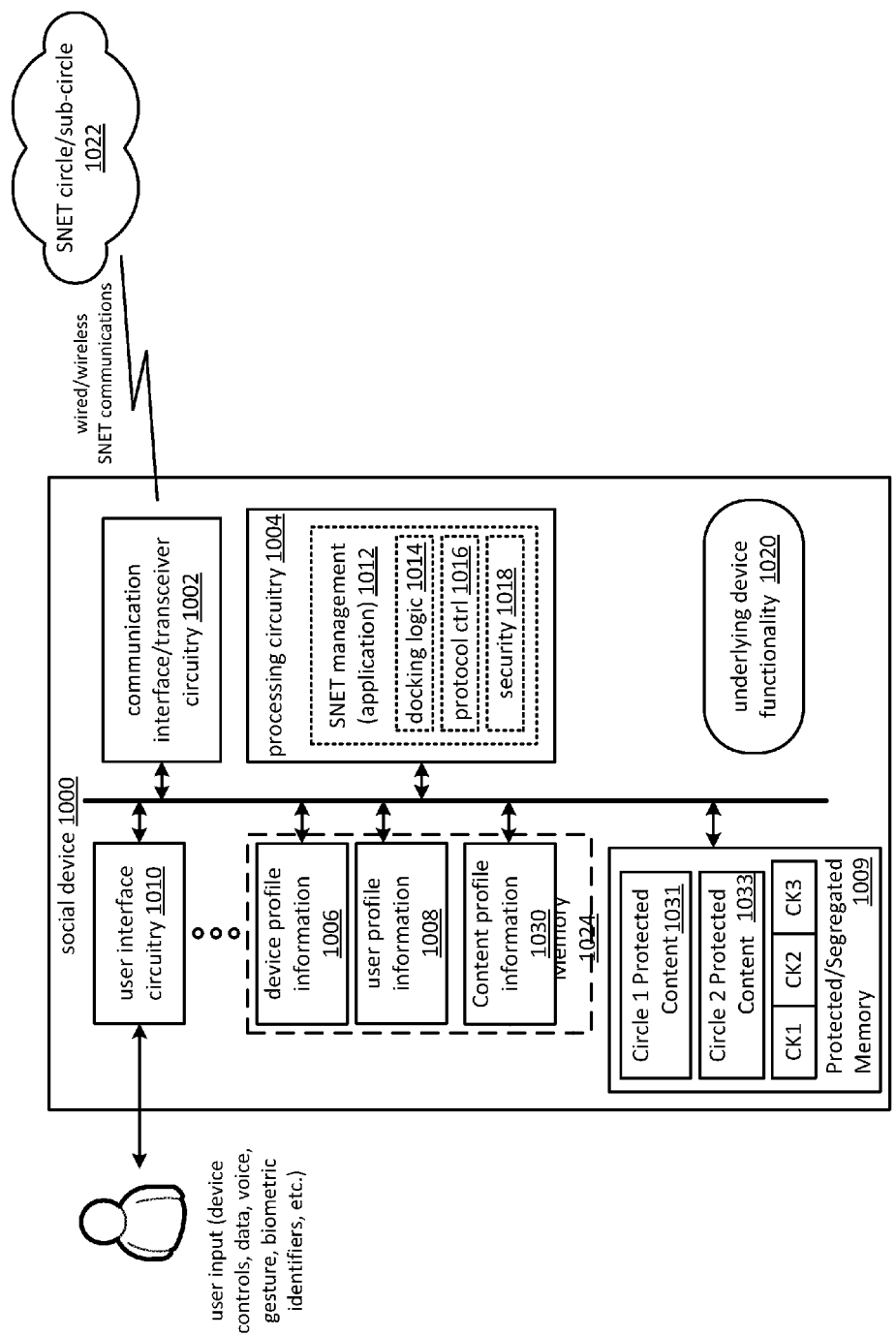
FIG. 10 is a schematic block diagram of an embodiment of a social device or server comprising functionality operable to support social network circle/sub-circle membership and content protection security measures in accordance with the disclosure.

FIG. 10 is a schematic block diagram of an exemplary social device 1000 comprising integral functionality operable to support social network circle/sub-circle membership and communications in accordance with the invention. In at least one embodiment, social device 1000 can be implemented as a social server. In the illustrated embodiment, a communication interface and transceiver circuitry 1002 is operable to perform wired or wireless communications between social device 1000 and an SNET circle/sub-circle 1022 over one or more communication channels. Depending on the capabilities and configuration of the social device 1000, communications with an SNET may be unilateral or bidirectional/interactive, and utilize either a proprietary or standardized communication protocol. In some embodiments, a member or resource within an SNET circle can accesses a server, social device, or circle resources such as an Internet-based resource identified by a URL reference, associated with a second, secure SNET circle or sub-circle.

The social device 1000 further includes processing circuitry 1004 operable to process and manage communications, services and associations between the device and other entities including members of an SNET circle 1022, third parties, software agents, etc. More particularly, the processing circuitry 1004 may include, for example, a software management application 1004 comprising one or more of docking logic 1014, communication protocol control 1016 and security/authentication functionality 1018.

The social device 1000 further may utilize profile information that can take many forms and be maintained in a static or dynamic memory, such as memory 1024. Such profile information enables a social device and/or user to present an image of itself and its capabilities to other members of an SNET. As described more fully below, device and user profile information 1006 and 1008 may be utilized in various ways in accordance with the invention to facilitate a variety of social interactions. Content profile information 1030 can be used to store user preferences related to particular content instances, items, or types, and can be used in selecting an appropriate level of content protection for content provided by social device 1000. Depending on the capabilities and requirements of a particular device (and other members of an SNET), a device or user profile may be static or dynamic.

In addition to memory 1024, social device 1000 can include protected memory 1009 to implement a keystore, or to store other sensitive information. For example, protected memory 1009 can be segmented and used to store keys CK1, CK2, and CK3 or other circle secrets associated with multiple different SNET circles with which the social device interacts.

In some embodiments, portions of protected memory 1009 are dedicated to interactions and information to be shared within, but not always between, different circles. For example, protected memory 1009 can be segregated to store protected content associated with circle 1 in memory portion 1031, protected content associated with circle 2 memory portion 1033. The circles with which each memory portion is associated can belong to the same or different social networks. Furthermore, although not specifically illustrated, multiple different SNET circles can use different profile information, so that device profile information 1006, user profile information 1008, and content profile information 1030 can also be stored in a protected, segregated memory that allows information associated with any particular SNET circle to be used substantially only in conjunction with communications related to that SNET Circle.

In certain embodiments, the social device 1000 interacts with a user(s) via user interface circuitry 1010. User input to the social device 1000 may include, for example, data entry through a keypad, touchscreen, remote control device, gaming controller, device control buttons, voice or gesture commands, storage device, etc. Authorized access to or control of the social device 1000 can be facilitated through unique biometric identifiers, passwords, token-based identification, trusted authorities or documents such as a driver's license or passport, and like authentication means.

Social device 1000 also performs core or underlying functionality 1020, various examples of which are described herein. Alternatively, the social device may primarily function as a social networking interface or communication device, or be programmable to perform specific functions within an SNET circle/sub-circle.

Figure 11:
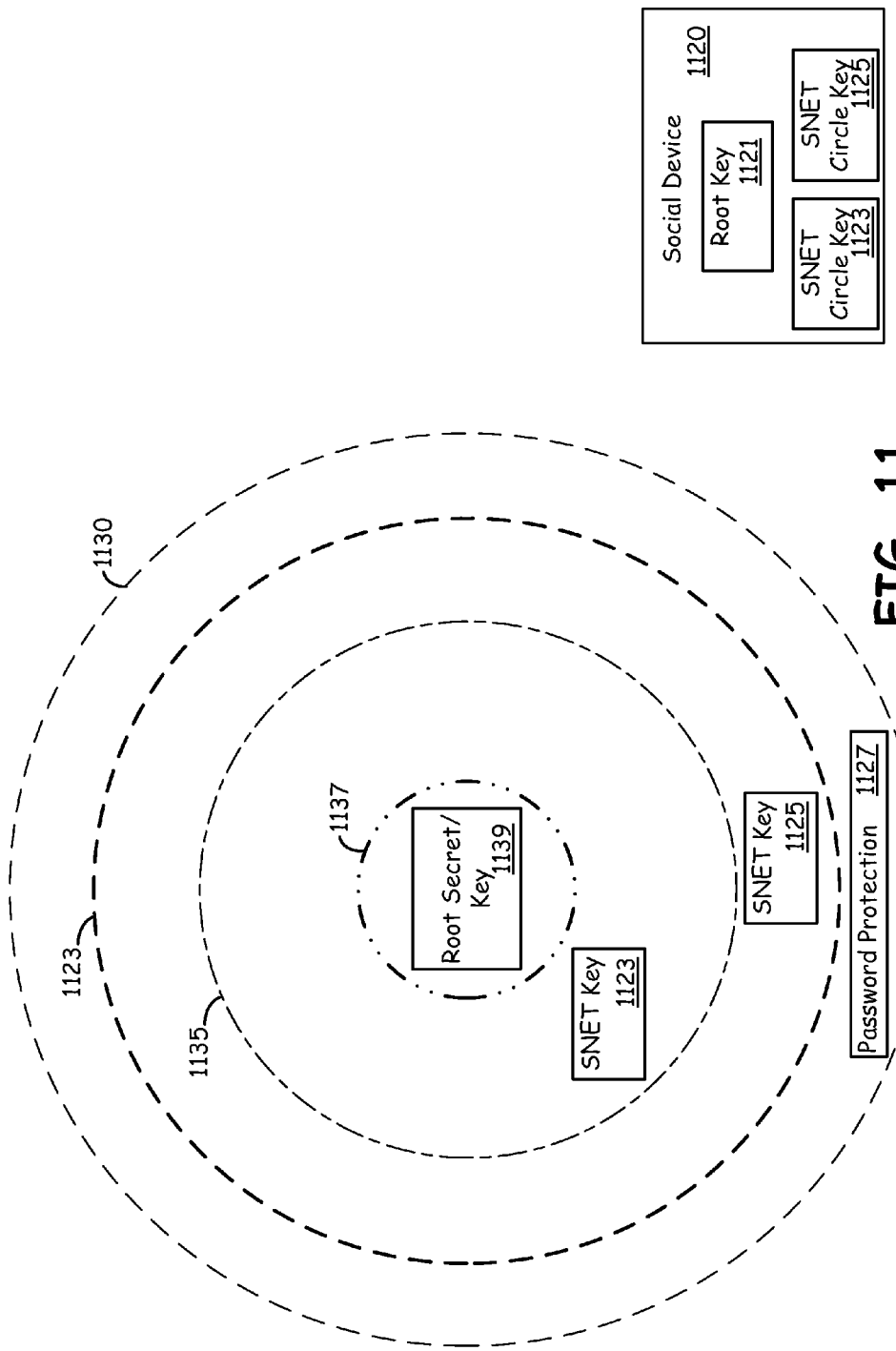
FIG. 11 is a diagram illustrating a relationship between various social circles, or rings, of a social network employing various levels of security, according to embodiments of the present disclosure.

Referring next to FIG. 11, use of different circle secrets, keys, or other circle-specific security for encoding or encrypting content is illustrated according to various embodiments of the present disclosure. Use of circle-specific keys can assist a social device in determining what level of content protection to apply to shared content, to identify circle members who are permitted to receive shared content using a level of protection implemented by simply encrypting the shared content using the circle-specific keys, and by allowing devices that are temporarily docked with an SNET circle to send content requests, and receive requested content.

FIG. 11 illustrates a progression of security from least protected outer ring, or circle, 1130 of a social network to a most protected inner ring, or circle, 1137. In at least some embodiments, the circle 1137 represents a virtual security circle that includes only a social device itself. Circle 1137 can be implemented in software or hardware, including being implemented at the chip level, and in general each social device that is connected, docked, or a member of any particular circle can implement its own inner security circle. Sometimes multiple circles can be implemented in a single device, using software for one circle and hardware for another.

The next most protected ring after inner circle 1137, which is protected by a root secret 1139, is SNET circle. 1135 which is protected by an SNET key 1123. The next most protected ring is SNET circle 1133, which is protected by SNET key 1125. The outermost ring, SNET circle 1130, employs simple password protection 1127.

In effect, members, docked devices, or others can gain access to the resources of SNET circle 1130 through use of a shared password. Use of shared passwords can provide adequate security for shared content in many instances, particularly if password complexity requirements are imposed. However, in general, simple password protection does not provide the same level of security as various shared key, or public-key encryption techniques. Thus, in at least some embodiments, SNET circle 1130 is considered to be less secure, then SNET circles 1133, 1135, at 1137, which are protected using security keys, and additional protection is applied to content shared between a more secure SNET circle like circle 1133, and a less secure SNET circle 1130.

As illustrated by FIG. 11, social device 1120 is a member of some but not all of the SNET circles 1130, 1133, 1135, and 1137. For example, social device 1120 has access to SNET key 1123, thereby allowing social device 1120 to communicate with members of social circle 1135, because each of the members of social circle 1135 also have access to SNET key 1123. Likewise, social device 1120 has access to SNET key 1125, which allows communication and easy sharing of content with members of SNET circle 1133, again because each of the members of SNET circle 1133 has access to SNET key 1125.

Social device 1120 has a root key 1121 that it can use to establish its own SNET circle having itself as its only member. Devices can be invited to dock with the SNET circle to receive requested content, or request docking in the SNET circle, in which case root key 1121 can be used to generate other SNET keys (not illustrated), which can be distributed to the device being docked. Once a device is docked into a particular SNET circle, the device can receive shared content at a level determined by social device 1120 based on various preferences and settings associated with the circle. Inner circle 1137 may include a single device, such as a social device, a server, router, or other network node having a root secret that can be used to generate SNET keys, also referred to herein as circle keys.

In some embodiments, multiple devices may each have the same root secret key, thereby allowing each of those devices to be a member of inter-circle 1137. The root secret key can be provided by manufacturer, obtained over a secure link, generated based on a common algorithm and using a distributed seed value, or otherwise. Various embodiments employ a one-time programmable (OTP) memory to store root key 1121. Note that in some embodiments, multiple levels of keys can be used for communication between members of a single SNET circle. For example, two devices may communicating using a circle key and an additional key used specifically for communication between two or more specific devices.

In various embodiments, an SNET security configuration including SNET Keys and other information can be loaded from one social device to another, from an SNET host to member devices, or the like. In cases where members are temporarily docked, or where a "permanent" member is removed, the security configuration for an SNET circle can be reloaded into remaining devices, to prevent access by the removed member. In some implementations, a social network hosting site is prevented from having access to information and content transferred within an SNET circle, because the hosting site does not store, or have access to circle keys. Furthermore, various embodiments can be implemented to prevent the host SNET from gaining access to raw data or media content. In some of those cases, the host SNET either acts to mediate an exchange or receives encrypted items without the ability to decrypt those items.

Figure 12:
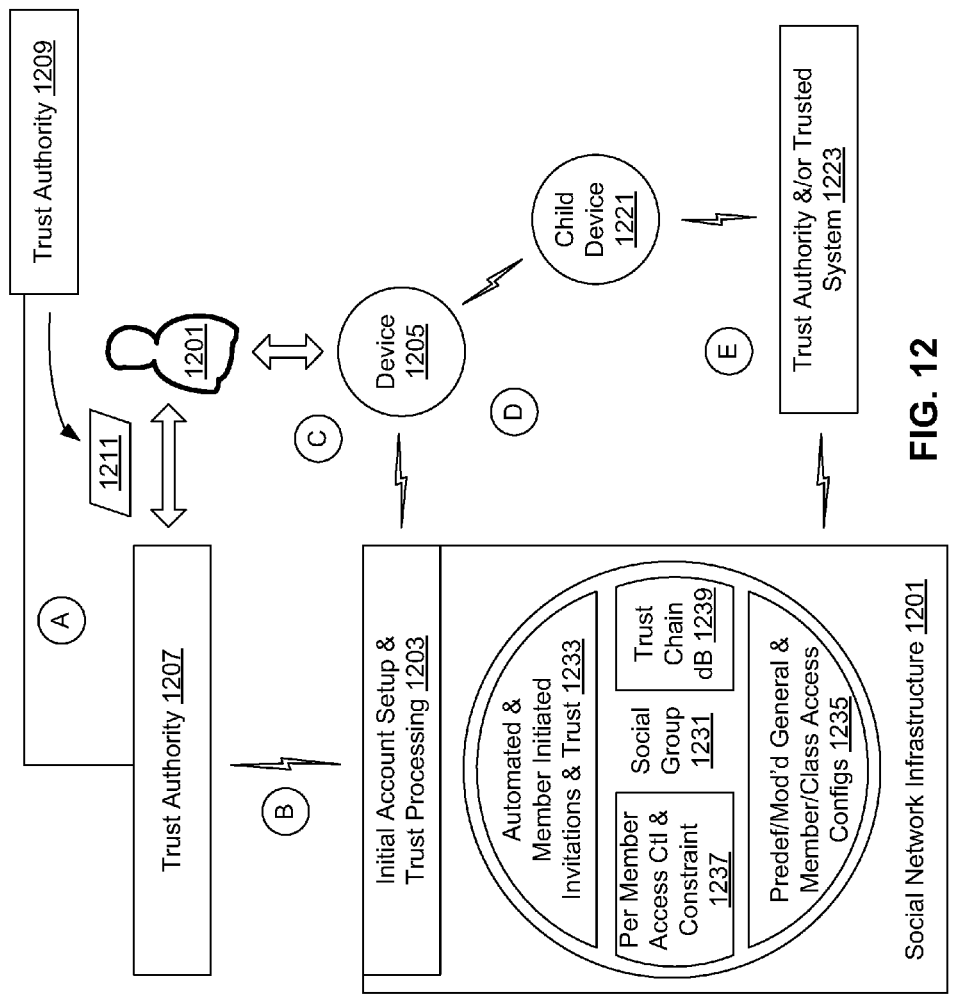
FIG. 12 is a diagram illustrating establishing and verifying levels of trust and trust chain links according to various implementations of the present disclosure.

Referring next to FIG. 12, the concepts of trust and trust chain links used by various embodiments to assign or select an appropriate level of content protection are discussed with reference to social network infrastructure 1201. Social network infrastructure 1201 includes initial account setup & trust processing module 1203, and various resources used to implement trust rules, control access to, and otherwise facilitate functioning of a social group 1231. The resources include invitations and trust module 1233, trust chain module 1235, per-member access module 1237, and access configurations module 1235. Social network infrastructure 1201 is connected via a communications link with trust authority 1207, which itself is in communication with trust authority 1209, and trusted system 1223. Trust authority 1207, trust authority 1209, and trusted system 1223 cooperate with each other to establish, verify, and adjust one or more trust levels associated with SNET members, such as human member 1210, device 1205, and child device 1221, SNET circles, SNET chains, and the like. The various trust authorities and trusted systems can also be used to verify the trustworthiness of other trust authorities and systems, regardless of membership in a particular SNET or SNET circle.

Also illustrated in FIG. 12 are trust chain links A-D. Trust chain link A illustrates a trust link from a pre-established trust relationship between human member 1210 and trust authority 1209, for example a birth certificate. Using either a direct communication or via an intermediate document, e.g. the birth certificate, human member 1210 can extend the trust chain via another trust authority 1207, e.g., passport, driver's license service). This can be achieved through an electronic communications link, such as a wireless link, via staff to staff communication between trust authority 1207 and trust authority 1209, or both, plus interaction with human member 1210 or a trusted document 1211, for example a driver's license, passport, etc.

Visual and description information, including age, gender, weight, height, address, social security numbers, "freshness" date, or the like, can also be delivered from trust authority 1207 to trust authority 1209. This information can receive another layer via the trusted authority 1207 as it interacts with human member 1210, either providing "fresh" confirmation or adding a superseding entry. Other sources can also be used to verify each of the elements of information transmitted between trust authority 1207 and trust authority 1209.

After interacting with trust authority 1209 and human member 1210, trust authority 1207 establishes a trust rating for human member 1210, which indicates whether or not any information given seems in conflict or unusual. For example, a trust rating of 80% may be given to human member 1210, indicating that there is an 80% probability that the associated trust information is correct.

Specific resolution regarding why the rating is not higher or lower, may be tied to trust ratings of specific pieces of information used to establish the overall trust level. For example, a passport with visual face recognition correlation with human staff confirmation that the person present plus the passport photo are likely the same person might yield an 85% confidence level that the person is who they say they are. A comparison of hospital recorded biometric information obtained at the time human member 1210 was born, for example an iris print, fingerprint, or other information, with corresponding information obtained at the present time from human member 1210 might yield a much higher confidence level, for example 95%. The missing 5% might involve elements further up the chain, e.g., the trust link associated with the hospital and its staff.

Once human member 1210 becomes trusted, for example through the interactions just described, he may attempt to interact with social network infrastructure 1201 through device 1205 to establish an account via initial account setup & trust processing module 1203. Note that the communication links illustrated between various devices can include one or more wired or wireless communication networks or links along with any needed bridging, routing and access nodes between those devices.

When setting up the account, human member 1210 can provide information identifying himself and other associated information. From such information, initial account setup & trust processing module 1203 interacts with the trust authority 1207, either at the same time or post facto, to gather trust information and ratings of 1207. These ratings can be used by initial account setup & trust processing module 1203 to establish its own trust ratings, and construct challenge questions that will be used to challenge human member 1210 via device

1205. Overall, from such queried interactions, information received from trust authority 1207, information received directly from human member 1210 via device 1205, and received trust ratings, new trust information and updates can be generated and stored in one or more of trust chain database 1239, access control 1237, invitations and trust 1233, and access configuration 1235. The trust ratings, updates, and other information can also be communicated in whole or in part back to trust authority 1207 for storage or distribution to other storage locations.

Note that in various instances, when generating adaptive trust ratings, newer data may be overlaid onto the older data without producing or replacing the older data, at least to an extent permitted by storage. Overlaying the data permits newer data and older data to be taken into account, given different weightings based on currency of the information, and allows an overall trust rating to settle at a particular level over time.

At this point, human member 1210 has established a trust rating and trust relationship with social network infrastructure 1201, but device 1205 is not yet trusted. This can be problematic in some instances, because account information received from device 1205 could have been provided by an imposter posing as human member 1210. Some embodiments, therefore, fully confirm the account information via interactions between human member 1210 and a trusted device, trusted person, or both, for example via trust link B. This might involve human member 1210 going back to the trust authority 1207 or to another location where a trusted device is available, and through which a trust relationship can be confirmed through interaction between initial account setup & trust processing module 1203 and human member 1210 via a trusted interface. Such trusted information can also be further layered in via storage in social network infrastructure 1201 and trust authority 1207. Likewise, other trust authorities could be used by human member 1210 to buttress his trust level. For example, trust authority 1209 could directly interact with trust authority 1207 for further confirmation, or to gather further trust information, e.g., "What was your mother's maiden name and where were you born?" which might not be available from trust authority 1207.

In various embodiments, once human member 1210 is established as a trusted member, he can confer trust to one or more of his "parent" devices, such as the device 1205. Device 1205 is referred to as a parent of human member 1210, because communications between social network infrastructure 1201 and human member 1210 pass through device 1205. Conferring trust from human member 1210 to device 1205 establishes another link in the trust chain, illustrated as trust link C. One way for human member 1210 to confer trust to device 1205 is by downloading one or more trusted software applications from initial account setup & trust processing module 1203 onto device 1205.

The downloaded software could analyze device 1205 for malware, security level capabilities, tampering indications, and identify of any trust servicing components such as cameras, fingerprint readers, or other biometric systems, and the like. In many instances biometrics can play an important role in verifying and maintaining trust with a device connected to a social network. For example, constant or periodic challenges and checks using biometrics, if included in a device, can allow the device to maintain a higher trust level than devices not having such biometric input. In general, the above listed security characteristics, and others, can used in making various determinations related to providing protected content.

The software can, in some embodiments, remove malware or suggest a way to repair problems via other third party software. The software can also report security threats, tampering, etc. to human member 1210 or Social network infrastructure 1201. After it has been established that device 1205 is clear of malware or other security threats, a trust level can established for the device. In some implementations, even if malware existed, device 1205 can be granted membership, but the trust level could reflect the presence of malware, and device 1205 could be red-flagged.

Once device 1205 becomes a member of the SNET, chain of trust link C can be established between human member 1210 and device 1205, now the trusted parent member 1201. In some embodiments, after device 1205 becomes a member of the SNET associated with social network infrastructure 1201, device 1205 can deliver capability, social services, control, configuration, status, etc., information to initial account setup & trust processing module 1203. Such information might indicate that 1205 is capable of servicing child human members, child device members, or only operate as a standalone device. In addition and likely in response, initial account setup & trust processing module 1203 delivers social operating program code (if not pre-loaded by the manufacturer) in the form of drivers, API's, Apps, and associated data for future use by device 1205. All of such information, along with trust information can be stored by various elements of social network infrastructure 1201. Thereafter, periodically, upon device 1205 logging in to the SNET, or otherwise, such information can be used to challenge 1205 and verify the authenticity of 1205 with some degree of trust.

At this point human member 1210 and device 1205 have received trust ratings, which may change over time as interactions and challenges occur. To add child device 1221 as a trusted member human member 1210 and device 1205 can interact to vouch for child 1221's trustworthiness. Alternatively or in addition, 1205 might assist in the process of establishing the chain of trust link D to child device 1221. Both can occur, especially wherein the device is a child device, i.e. a device that interacts with social network infrastructure 1201 only via another device. For example, child device 1221 might be a printer or a television, whereas device 1205 might be a computer or a set-top box (STB). In either case, child device 1221 may operate as a standalone device with an upstream interface to device 1205, and not directly with social network infrastructure 1201.

In such cases, child membership for child device 1221 could be established via device 1205. This can, in some embodiments, involve device 1205 retrieving and delivering to social network infrastructure 1210 information regarding child device 1221, and the link to child device 1221. It can also involve carrying out trust challenges between device 1205 and child device 1221, or between social network infrastructure 1201 and child device 1221, with bridging of such challenges via device 1205. Child device 1205 might also deliver trust program code received from initial account setup and trust processing 1203 or human member 1210, for example apps, drivers, firmware, etc., to child device 1221 to establish and maintain trust levels of child device 1221.

Device 1205 might also assist in helping child device 1221 perform better socially. For example, child device 1221 might not be a social device, but instead be designed to service only a single device 1205. With additional software running on device 1205, for example a social driver received from social network infrastructure 1201, device 1205 and members of a social network associated with social network infrastructure 1201 can gain access to status, controls, interfaces, and services offered by child device 1221. In some cases, child device 1221 can raise its trust level post facto by being taken to or otherwise directly interacting with a trusted device or authority 1223 that has a higher trust rating than that of device 1205. And even if the trust level is not higher, trusted device or authority 1223 can increase the trust level of child device 1221 because an additional, different trust chain E is used.

Similarly, although possibly contributing lesser levels of trust level or rank enhancements, other members (devices or humans) can vouch for any other member, creating another trust chain link and further bolstering the trust level of such trusted member. In various embodiments, even with a zero level of trust rating, all members could participate and thereafter build trust in the variety of ways mentioned above. Whether high or low, each member can be represented within their groups/circles with trust indicators. For example, using the rainbow (frequency sequence), the more trusted the more moving toward purple (and having a mouse over textual rating number such as 80%). The less trusted moving more toward red (for example, no trust being red) and mouse over identifies 0%. Also, based on trust levels, a social group 1231 can place limitations via per member access control and constraints 1237 on access control and other constraints. For example, in one implementation only members with 70% trust levels can gain access to "my home video", while members with 20% trust levels can access third party video stored in a trusted NAS child member device (not shown).

For various device members of an SNET, trust can extend to malware free ratings as well as authentication. In other words, authentication can be extended to cover an authenticated service and service interactions. In other words, if a member is who it says it is, and the member does what it promises to do, the member's ratings go up. This can allow trust levels to can adapt over time, and increase or decrease as services are received or preformed. In some instances, multiple separate trust ratings and indications are used. For example, in a sales/shopping group, a "star rating" may be 5, based on a large number of satisfied member purchasers, an identity/authentication rating, i.e. "I am who I say I am," is quite low, perhaps at 12% while operating a sales portal member server that has no independently established trust beyond that obtained from successful transactions.

In various embodiments, granting membership to device 1205 includes extending social group 1231, and can be accomplished by an icon drag and drop on a representation of social group 1231 displayed on an SNET interface (not illustrated). Once device 1205 is granted membership in social group 1231, human member 1210 can, via device 1205, add himself to a social group 1231, which can in some instances be a particular social circle or sub-group, using a drag and drop procedure. Then, other member humans or devices can be added to social group 1231 in a similar manner. Furthermore, human member 1210 can alter or create a default set of rules establishing the basis for other members (human or devices) adding further members to the social group 1231.

SNET circle communications in accordance with various embodiments described herein can utilize a variety of transmission protocols. By way of example, most communication over the Internet is currently performed in accordance with the Transmission Control Protocol (TCP) and User Datagram Protocol (UDP). As is known, TCP typically provides an intermediate level of communication services between, for example, an application program and the Internet Protocol (IP). Port numbers are used to identify end-points for sending and receiving applications on a host (often referred to as "Internet sockets" or "network sockets"). Internet sockets facilitate delivery of incoming data packets to an appropriate application process or thread, as determined by a combination of local and remote (e.g., SNET circle) IP addresses and port numbers. In some embodiments, the Real-time Transport Protocol (RTP) running over UDP may be employed for media streaming applications, real-time multiplayer gaming, voice over IP (VoIP), and like applications that are tolerant of a certain level of packet loss and may not require a dedicated end-to-end-connection.

In some embodiments, transmissions between SNET circle members and between members of different SNET circles can employ various port addressing and masking techniques to further enhance security. IDs of transmitting devices can be protected by blocking snooping of headers, use of internal IP addresses, proxies, security agents, VPN tunneling, or the like.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributed (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method used in a social network that includes a plurality of social circles, the method comprising:
   receiving from a requestor, at a computing device managing at least a portion of social circle communications, a request for content available from a first social circle of the plurality of social circles;
   determining, at a processing device included in the social circle, a status of the requestor with respect to the social network;
   selecting a level of content protection based, at least in part, on both:
      the status of the requestor with respect to the social network, wherein the status indicates whether the status of the requestor satisfies content security requirements associated with the first social circle, and
      a security characteristic of a device that forms a part of a presentation pathway of the content, wherein the device includes both secure and unsecure hardware elements internal to the device, either or both of which are included in the presentation pathway; and
   providing the content to the requestor using the level of content protection selected.

2. The method of claim 1, wherein the status of the requestor comprises membership information.

3. The method of claim 1, wherein the status of the requestor comprises a security characteristic associated with the requestor.

4. The method of claim 1, wherein the level of content protection is based at least in part on applying a modification to the content.

5. The method of claim 4, wherein the modification comprises watermarking.

6. The method of claim 1, wherein the level of content protection is carried out via digital rights management restrictions.

7. Device circuitry within a device housing for use by a first member of a social network, the social network including a social network circle, the device circuitry comprising:
   interface circuitry configured to receive content of a second member of the social network via the social network circle, the content having a first level of protection selected from a plurality of levels of protection based, at least in part, on at least one security characteristic of a presentation pathway within the device housing, wherein the presentation pathway includes either or both secure and unsecure hardware elements within the device housing;

processing circuitry configured to support digital rights management in conformance with the first level of protection of the content; and the processing circuitry also being configured to support a security exchange with the social network via the interface circuitry, the security exchange being used to determine the first level of protection for the content.

8. The device circuitry of claim 7, wherein the processing circuitry is configured to at least assist in generating the at least one security characteristic.

9. The device circuitry of claim 7, wherein the processing circuitry identifies a security breach that reaches within the housing.

10. The device circuitry of claim 7, wherein security of the presentation pathway is challenged at least in part via the interface circuitry.

11. The device circuitry of claim 7, wherein each of the plurality of levels of protection comprising a set of digital rights limitations.

12. The device circuitry of claim 7, wherein the content comprises a version of original content, and the version being produced in response to the selection of the first level of protection.

13. The device circuitry of claim 7, further comprising a security partition supporting the security of at least a portion of the presentation pathway.

14. A social network system supporting transfer of content from a social circle to a destination device, the social network system comprising:

a communications interface configured to:
couple with the destination device, and
receive a request from the destination device to provide access to the content;

at least one processing module, coupled to the communications interface, the at least one processing module configured to:
identify a security characteristic of a presentation pathway associated with the destination device, wherein the destination device includes both secure and unsecure hardware elements internal to the device, either or both of which are included in the presentation pathway, and
identify a level of protection for the content based at least in part on the security characteristic of the presentation pathway.

15. The social networking system of claim 14, wherein the presentation pathway includes elements within the destination device.

16. The social networking system of claim 14, wherein the destination device supports a human member, and the level of protection for the content is also based on security information relating to the human member.

17. The social networking system of claim 14, wherein the level of protection requires digital rights management elements within the destination device.

18. The social networking system of claim 14, wherein the at least one processing module challenges the destination device to at least assist in the identification of the level of protection.

19. The social networking system of claim 14, wherein the communications interface is configured to deliver a security program to the destination device, the security program supporting the identification of the level of protection.

20. The social networking system of claim 14, wherein the identification of the level of protection is reevaluated after a period of time.

21. The social networking system of claim 14, wherein the level of protection involves a first level of digital rights restrictions modified by the destination device to support redistribution by the destination device using a second level of digital rights restrictions.

* * * * *